(12) United States Patent
Umehara et al.

(10) Patent No.: US 11,673,209 B2
(45) Date of Patent: Jun. 13, 2023

(54) MANUFACTURING METHOD FOR AN ELECTRODE WITH A SEPARATOR LAYER AND MANUFACTURING APPARATUS FOR AN ELECTRODE WITH A SEPARATOR LAYER

(71) Applicant: TOYOTA JIDOSHA KABUSHIKI KAISHA, Aichi-ken (JP)

(72) Inventors: Masakazu Umehara, Toyota (JP); Takahiro Kuhara, Toyota (JP); Shingo Komura, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 305 days.

(21) Appl. No.: 16/832,493

(22) Filed: Mar. 27, 2020

(65) Prior Publication Data

US 2020/0223010 A1 Jul. 16, 2020

Related U.S. Application Data

(62) Division of application No. 15/260,413, filed on Sep. 9, 2016, now Pat. No. 10,646,958.

(30) Foreign Application Priority Data

Sep. 11, 2015 (JP) .................... 2015-180168

(51) Int. Cl.
*B23K 26/08* (2014.01)
*B23K 26/38* (2014.01)
(Continued)

(52) U.S. Cl.
CPC .......... *B23K 26/0838* (2013.01); *B23K 26/38* (2013.01); *B23K 26/402* (2013.01);
(Continued)

(58) Field of Classification Search
CPC .... B23K 26/38; B23K 26/00; B23K 26/0006; B23K 26/009; B23K 26/0093;
(Continued)

(56) References Cited

U.S. PATENT DOCUMENTS 3,930,825 A * 1/1976 Chui ..................... C03B 21/06
65/97
6,387,564 B1 5/2002 Yamashita et al.
(Continued)

FOREIGN PATENT DOCUMENTS

CN 101633078 A 1/2010
CN 103339766 A 10/2013
(Continued)

*Primary Examiner* — Chris Q Liu
(74) *Attorney, Agent, or Firm* — Sughrue Mion, PLLC

(57) ABSTRACT

A manufacturing method and a manufacturing apparatus for a separator layer-coated electrode are provided capable of shortening the time required to cut out a separator layer-coated electrode with a laser beam. In a cutting process, a laser beam is irradiated to a laser irradiation target portion of a strip-shaped separator layer-coated electrode from a front-side separator layer side to cut a strip-shaped separator layer-coated electrode. Prior to the cutting process, a preheating process is conducted to preheat the front-side separator layer in the laser irradiation target portion.

1 Claim, 12 Drawing Sheets

(51) Int. Cl.
  *B23K 26/402* (2014.01)
  *H01M 4/04* (2006.01)
  *B23K 101/36* (2006.01)
  *H01M 50/46* (2021.01)
  *H01M 50/406* (2021.01)
  *B23K 103/16* (2006.01)

(52) U.S. Cl.
  CPC ....... *H01M 4/0404* (2013.01); *H01M 50/406* (2021.01); *H01M 50/46* (2021.01); *B23K 2101/36* (2018.08); *B23K 2103/172* (2018.08)

(58) Field of Classification Search
  CPC .... B23K 26/0096; B23K 26/02; B23K 26/08; B23K 26/14; B23K 26/12; B23K 26/16; B23K 26/18; B23K 26/34; B23K 26/20; B23K 26/346; B23K 26/351; B23K 26/352; B23K 26/36; B23K 26/50; B23K 26/60; B23K 26/70; H01M 4/04
  USPC .......... 219/121.72, 535, 528, 549, 544, 530, 219/541, 121.82, 121.84, 204, 211, 212, 219/522, 531, 540, 543, 553, 635, 643, 219/645, 662, 672

See application file for complete search history.

(56) References Cited

U.S. PATENT DOCUMENTS

| | | |
|---|---|---|
| 2005/0029240 A1 | 2/2005 | Dugan et al. |
| 2009/0325058 A1* | 12/2009 | Katayama ......... H01M 10/0431 |
| | | 429/142 |
| 2010/0282725 A1 | 11/2010 | Johnson et al. |
| 2012/0186334 A1* | 7/2012 | Steinhauser .............. F01N 9/00 |
| | | 73/61.76 |
| 2013/0252086 A1 | 9/2013 | Stern et al. |
| 2013/0302674 A1 | 11/2013 | Stern et al. |
| 2013/0309566 A1 | 11/2013 | Umehara |
| 2017/0058389 A1 | 3/2017 | Gayden et al. |
| 2017/0072512 A1* | 3/2017 | Umehara ............. B23K 26/402 |
| 2017/0084903 A1 | 3/2017 | Umehara |

FOREIGN PATENT DOCUMENTS

| | | |
|---|---|---|
| JP | H03-226965 A | 10/1991 |
| JP | H06-023574 A | 2/1994 |
| JP | 2001-047263 A | 2/2001 |
| JP | 2003-103382 A | 4/2003 |
| JP | 2006-324095 A | 11/2006 |
| JP | 2007-242506 A | 9/2007 |
| JP | 2011-228634 A | 11/2011 |
| JP | 2013-119095 A | 6/2013 |
| JP | 2015-72785 A | 4/2015 |
| KR | 2000-0050910 A | 8/2000 |
| KR | 2000-0075765 A | 12/2000 |
| WO | 98/38688 A1 | 9/1998 |
| WO | 2012/101816 A1 | 8/2012 |

* cited by examiner

MANUFACTURING METHOD FOR AN ELECTRODE WITH A SEPARATOR LAYER AND MANUFACTURING APPARATUS FOR AN ELECTRODE WITH A SEPARATOR LAYER

CROSS-REFERENCE TO RELATED APPLICATIONS

This application is a divisional application of U.S. patent application Ser. No. 15/260,413, filed Sep. 9, 2016, which is based upon and claims the benefit of priority from the prior Japanese Patent Application No. 2015-180168 on Sep. 11, 2015, the entire contents of which are incorporated herein by reference.

BACKGROUND

Technical Field

The present disclosure relates to a method for manufacturing an electrode with a separator layer and an apparatus for manufacturing an electrode with a separator layer.

Related Art

Patent document 1 discloses an electrode body provided with a positive electrode including a positive current collecting member and positive mixture layers laminated on a front surface and a back surface of the positive current collecting member, and a negative electrode including a negative current collecting member and negative mixture layers laminated on a front surface and a back surface of the negative current collecting member. A secondary battery provided with the above electrode body is further disclosed. In this electrode body, a separator layer made of stacked thermoplastic resin particles (e.g., polyethylene particles) is formed on the front surface of the positive mixture layer of the positive electrode or the front surface of the negative mixture layer of the negative electrode.

RELATED ART DOCUMENTS

Patent Documents

Patent Document 1: WO 98/38688

To be concrete, the negative mixture layer is formed on each of the front surface and the back surface of a strip-shaped negative current collecting member. Then, slurry produced by dispersing thermoplastic resin particles in a solvent is applied to the negative mixture layer and dried (the solvent is vaporized). In this manner, a strip-shaped negative electrode with separator layers is produced, including the strip-shaped negative current collecting member, the front-side negative mixture layer laminated on the front surface of the negative current collecting member, the front-side separator layer that is laminated on the front-side negative mixture layer that contains the thermoplastic resin particles, the back-side negative mixture layer that laminated on the back surface of the negative current collecting member, and the back-side separator layer that is laminated on the back-side negative mixture layer and contains the thermoplastic resin particles. Thereafter, the strip-shaped negative electrode with the separator layer is cut into a separator layer-coated negative electrode having a predetermined length.

SUMMARY

Technical Problems

Meanwhile, the present inventors have studied a laser cutting technique as a method for cutting an electrode with a separator layer (a separator layer-coated electrode). However, this laser cutting technique could not quickly cut the separator layer-coated electrode. To be concrete, a separator layer containing thermoplastic resin particles (e.g., polyethylene particles) has a low transmittance of laser beam. For instance, when a strip-shaped separator layer-coated electrode is to be cut by irradiation of a laser beam applied from a front-side separator layer side, the light quantity (energy quantity) of the laser beam allowed to pass through the front-side separator layer and then reach the front-side electrode mixture layer and the current collecting member is small. Thus, this method could not cut a strip-shaped separator layer-coated electrode quickly.

The present disclosure has been made to address the above problems and has a purpose to provide a method for manufacturing an electrode with a separator layer capable of quickly cutting the separator layer-coated electrode with a laser beam, and, an apparatus for manufacturing an electrode with a separator layer.

Means of Solving the Problems

One typical aspect of this disclosure provides a manufacturing method for an electrode with a separator layer, the method comprising cutting a strip-shaped separator layer-coated electrode including; a strip-shaped current collecting member having a front surface and a back surface; a front-side electrode mixture layer laminated on the front surface of the current collecting member; and a front-side separator layer laminated on the front-side electrode mixture layer, the front-side separator layer containing thermoplastic resin particles, by irradiation of a laser beam to a laser irradiation target portion extending over a whole width of the strip-shaped separator layer-coated electrode (i.e., extending across the strip-shaped separator layer-coated electrode along a width direction) to produce a separator layer-coated electrode having a predetermined length (a prescribed length), wherein the cutting includes irradiating the laser beam to the laser irradiation target portion from a front-side separator layer side to cut the strip-shaped separator layer-coated electrode, and the method further comprises preheating the front-side separator layer in the laser irradiation target portion prior to the cutting.

In the aforementioned method for manufacturing the separator layer-coated electrode, in the cutting process, the strip-shaped (long) separator layer-coated electrode including the strip-shaped current collecting member, the front-side electrode mixture layer laminated on the front surface of this current collecting member, and the front-side separator layer that is laminated on the front-side electrode mixture layer and contains the thermoplastic resin particles is cut with a laser beam to produce a separator layer-coated electrode having a predetermined length (e.g., a rectangular sheet or strip shape).

To be concrete, in the cutting process, a laser beam is irradiated to the laser irradiation target portion of the strip-shaped separator layer-coated electrode (a target portion to be irradiated with a laser beam, that is, a target portion to be cut with a laser beam) in a direction from the front-side separator layer side to the current collecting member side, thereby cutting the strip-shaped separator layer-coated electrode.

In the aforementioned manufacturing method, furthermore, prior to the cutting process, the preheating process is provided to preheat the front-side separator layer in the laser irradiation target portion. This is to heat in advance the thermoplastic resin particles constituting the front-side separator layer in the laser irradiation target portion before a laser beam is irradiated to the laser irradiation target portion in the cutting process.

Heating the thermoplastic resin particles gives heat energy to molecules constituting the thermoplastic resin particles, thereby activating thermal motion of the molecules constituting the thermoplastic resin particles. This enables enhancing the transmittance of a laser beam through the front-side separator layer (thermoplastic resin particles) in the laser irradiation target portion. The thus enhanced transmittance can increase the light quantity (energy quantity) of a laser beam allowed to pass through the front-side separator layer and then reach the front-side electrode mixture layer and the current collecting member. The aforementioned manufacturing method can therefore provide fast or quick cutting of the strip-shaped separator layer-coated electrode with a laser beam.

As the thermoplastic resin particles, thermoplastic polyolefin particles (polyethylene particles, polypropylene particles, etc.) may be used.

In the above-mentioned manufacturing method for an electrode with a separator layer, further, the strip-shaped separator layer-coated electrode may include a back-side electrode mixture layer laminated on the back surface of the current collecting member and a back-side separator layer laminated on the back-side electrode mixture layer, the back-side separator layer containing thermoplastic resin particles.

The aforementioned manufacturing method is configured to cut, with a laser beam, the strip-shaped separator layer-coated electrode including the strip-shaped current collecting member, the front-side electrode mixture layer laminated on the front surface of the current collecting member, the front-side separator layer that is laminated on the front-side electrode mixture layer and contains the thermoplastic resin particles, the back-side electrode mixture layer laminated on the back surface of the current collecting member, and the back-side separator layer that is laminated on the back-side electrode mixture layer and contains thermoplastic resin particles (hereinafter, also referred to as a double-sided laminated separator layer-coated electrode) to produce a separator layer-coated electrode having a predetermined length (a prescribed length).

More concretely, in the cutting process, a laser beam is irradiated to the laser irradiation target portion of the double-sided laminated separator layer-coated electrode in a direction from the front-side separator layer side to the current collecting member side, thereby cutting the strip-shaped separator layer-coated electrode. Also in this case, the laser beam transmittance through the front-side separator layer (thermoplastic resin particles) in the laser irradiation target portion is enhanced in advance in the prior preheating process. This can increase the light quantity (energy quantity) of the laser beam allowed to pass through the front-side separator layer and then reach the front-side electrode mixture layer, the current collecting member, and the back-side electrode mixture layer in the cutting process. The aforementioned manufacturing method therefore can provide quick cutting of the double-sided laminated separator layer-coated electrode.

In the aforementioned manufacturing method for the separator layer-coated electrode, moreover, the cutting may include irradiating the laser beam to the laser irradiation target portion from both the front-side separator layer side and a back-side separator layer side to cut the strip-shaped separator layer-coated electrode, and the preheating may include preheating the front-side separator layer and the back-side separator layer in the laser irradiation target portion prior to the cutting.

The above-described manufacturing method is configured to cut, with a laser beam, the strip-shaped double-sided laminated separator layer-coated electrode to produce a double-sided laminated separator layer-coated electrode having a predetermined length (e.g., a rectangular sheet shape). In the aforementioned manufacturing method, more concretely, in the cutting process, a laser beam is irradiated to the laser irradiation target portion of the double-sided laminated separator layer-coated electrode in a direction from both the front-side separator layer side and the back-side separator layer side to the current collecting member side to cut the strip-shaped double-sided laminated separator layer-coated electrode. Since a laser beam is irradiated from both the front-side separator layer side and the back-side separator layer side in the above manner, the strip-shaped double-sided laminated separator layer-coated electrode can be cut quickly.

In the aforementioned manufacturing method, additionally, in the preheating process, both of the front-side separator layer and the back-side separator layer in the laser irradiation target portion are heated. This enables enhancing in advance the laser beam transmittance of the front-side separator layer (the thermoplastic resin particles contained therein) and the laser beam transmittance of the back-side separator layer (the thermoplastic resin particles contained therein) in the laser irradiation target portion. This can increase the light quantity (energy quantity) of the laser beam allowed to pass through the front-side separator layer and then reach the front-side electrode mixture layer and the current collecting member and also the light quantity (energy quantity) of the laser beam allowed to pass through the back-side separator layer and then reach the back-side electrode mixture layer and the current collecting member in the cutting process. This method therefore enables quicker cutting of a double-sided laminated separator layer-coated electrode than above.

Another aspect of the present disclosure provides a manufacturing apparatus for an electrode with a separator layer, the apparatus being configured to cut a strip-shaped separator layer-coated electrode including: a strip-shaped current collecting member having a front surface and a back surface; a front-side electrode mixture layer laminated on the front surface of the current collecting member; and a front-side separator layer laminated on the front-side electrode mixture layer, the front-side separator layer containing thermoplastic resin particles, by irradiation of a laser beam to a laser irradiation target portion extending over a whole width of the strip-shaped separator layer-coated electrode (i.e., extending across the strip-shaped separator layer-coated electrode along a width direction) to produce an electrode with a separator layer having a predetermined length (a prescribed length), wherein the manufacturing apparatus comprises: a conveying device configured to convey the strip-shaped separator layer-coated electrode in a conveying direction from one side to other side in a longitudinal direction of the strip-shaped separator layer-coated electrode; a preheating device configured to preheat the front-side separator layer in the laser irradiation target portion of the strip-shaped separator layer-coated electrode that is being conveyed by the conveying device; and a laser irradiating device placed on a more downstream side than the preheating device in the conveying direction, and wherein the laser irradiating device is configured to irradiate the laser beam from a front-side separator layer side to the laser irradiation target portion of the strip-shaped separator layer-coated electrode that is being conveyed by the conveying device, the laser irradiation target portion including the front-side separator layer preheated by the preheating device, to cut the strip-shaped separator layer-coated electrode.

The above-described manufacturing apparatus for the separator layer-coated electrode is an apparatus configured to cut, with a laser beam, a strip-shaped (long) separator layer-coated electrode including the strip-shaped current collecting member, the front-side electrode mixture layer laminated on the front surface of the current collecting member, and the front-side separator layer that is laminated on the front-side electrode mixture layer and contains the thermoplastic resin particles, to produce a separator layer-coated electrode having a predetermined length (e.g., a rectangular sheet shape)

This manufacturing apparatus is provided with the conveying device configured to convey the strip-shaped separator layer-coated electrode from one side to the other side in the longitudinal direction of the relevant electrode (i.e., from an upstream side to a downstream side of a conveying line along the longitudinal direction). The manufacturing apparatus is further provided with the preheating device configured to preheat the front-side separator layer in the laser irradiation target portion (a target portion to be irradiated with a laser beam, that is, a target portion to be cut with the laser beam) of the strip-shaped separator layer-coated electrode under conveyance by the conveying device.

The manufacturing apparatus is further provided with the laser irradiating device placed in a position on the other side more frontward than the preheating device in the longitudinal direction of the strip-shaped separator layer-coated electrode that is being conveyed by the conveying device (that is, a more downstream side than the preheating device in the conveying line of the separator layer-coated electrode). Specifically, the manufacturing apparatus includes the laser irradiating device placed on a more downstream side than the preheating device in the conveying direction of the separator layer-coated electrode. This laser irradiating device is used to irradiate a laser beam from the front-side separator layer side to the laser irradiation target portion with the front-side separator layer having been preheated by the preheating device, under conveyance of the strip-shaped separator layer-coated electrode by the conveying device, to thereby cut the strip-shaped separator layer-coated electrode.

The aforementioned manufacturing apparatus is configured to, before irradiation of the laser beam to the laser irradiation target portion by the laser irradiating device, heat in advance the thermoplastic resin particles constituting the front-side separator layer in the laser irradiation target portion. This heating of the thermoplastic resin particles gives heat energy to molecules constituting the thermoplastic resin particles, thereby activating thermal motions of the molecules constituting the thermoplastic resin particles. This enables enhancing the transmittance of a laser beam through the front-side separator layer (thermoplastic resin particles) in the laser irradiation target portion. This can increase the light quantity (energy quantity) of the laser beam allowed to pass through the front-side separator layer and then reach the front-side electrode mixture layer and the current collecting member.

As described above, the aforementioned manufacturing apparatus is configured to irradiate a laser beam to the laser irradiation target portion from the front-side separator layer side with an enhanced laser beam transmittance of the front-side separator layer (thermoplastic resin particles) in the laser irradiation target portion. The aforementioned manufacturing apparatus can therefore provide quick cutting of the strip-shaped separator layer-coated electrode with a laser beam.

Moreover, in the manufacturing apparatus for an electrode with a separator layer, the strip-shaped separator layer-coated electrode may include a back-side electrode mixture layer laminated on the back surface of the current collecting member and a back-side separator layer laminated on the back-side electrode mixture layer, the back-side separator layer containing the thermoplastic resin particles.

The above-described manufacturing apparatus is configured to cut, with a laser beam, the strip-shaped separator layer-coated electrode including the strip-shaped current collecting member, the front-side electrode mixture layer laminated on the front surface of the current collecting member, the front-side separator layer that is laminated on the front-side electrode mixture layer and that contains thermoplastic resin particles, the back-side electrode mixture layer laminated on the back surface of the current collecting member, and the back-side separator layer that is laminated on the back-side electrode mixture layer and that contains thermoplastic resin particles (a double-sided laminated separator layer-coated electrode) to produce a separator layer-coated electrode having a predetermined length (a prescribed length).

More concretely, the laser irradiating device irradiates a laser beam to the laser irradiation target portion of the double-sided laminated separator layer-coated electrode in a direction from the front-side separator layer side to the current collecting member side, thereby cutting the strip-shaped separator layer-coated electrode. Also in this manufacturing apparatus, the laser beam transmittance of the front-side separator layer (thermoplastic resin particles) in the laser irradiation target portion can be enhanced in advance by the preheating device prior to cutting of the separator layer-coated electrode by the laser irradiating device. This can increase the light quantity (energy quantity) of the laser beam allowed to pass through the front-side separator layer and then reach the front-side electrode mixture layer, the current collecting member, and the back-side electrode mixture layer. The aforementioned apparatus can therefore provide quick cutting of the double-sided laminated separator layer-coated electrode.

Furthermore, in the aforementioned manufacturing apparatus for an electrode with a separator layer, the preheating device may be configured to heat the front-side separator layer and the back-side separator layer in the laser irradiation target portion, and the laser irradiating device may be configured to irradiate a laser beam to the laser irradiation target portion having the front-side separator layer and the back-side separator layer preheated by the preheating device, from both the front-side separator layer side and the back-side separator layer side, to cut the strip-shaped separator layer-coated electrode.

The aforementioned manufacturing apparatus is an apparatus configured to cut, with a laser beam, the strip-shaped double-sided laminated separator layer-coated electrode to produce a double-sided laminated separator layer-coated electrode having a predetermined length (e.g., a rectangular sheet shape). More concretely, the laser irradiating device irradiates a laser beam to the laser irradiation target portion of the double-sided laminated separator layer-coated electrode in a direction from both the front-side separator layer side and the back-side separator layer side to the current collecting member side to cut a strip-shaped double-sided laminated separator layer-coated electrode. Since laser beams are irradiated from both the front-side separator layer side and the back-side separator layer side in the above manner, the strip-shaped double-sided laminated separator layer-coated electrode can be cut quickly.

In the aforementioned manufacturing apparatus, additionally, the preheating device heats both the front-side separator layer and the back-side separator layer in the laser irradiation target portion. This enables enhancing in advance the laser beam transmittance of the front-side separator layer (the thermoplastic resin particles contained therein) and the back-side separator layer (the thermoplastic resin particles contained therein) of the laser irradiation target portion. This can increase the light quantity (energy quantity) of the laser beam allowed to pass through the front-side separator layer and then reach the front-side electrode mixture layer and the current collecting member and also the light quantity (energy quantity) of the laser beam allowed to pass through the back-side separator layer and then reach the back-side electrode mixture layer and the current collecting member. The aforementioned apparatus can therefore cut a double-sided laminated separator layer-coated electrode more quickly than above.

DESCRIPTION OF EMBODIMENTS

Example 1

Figure 1:
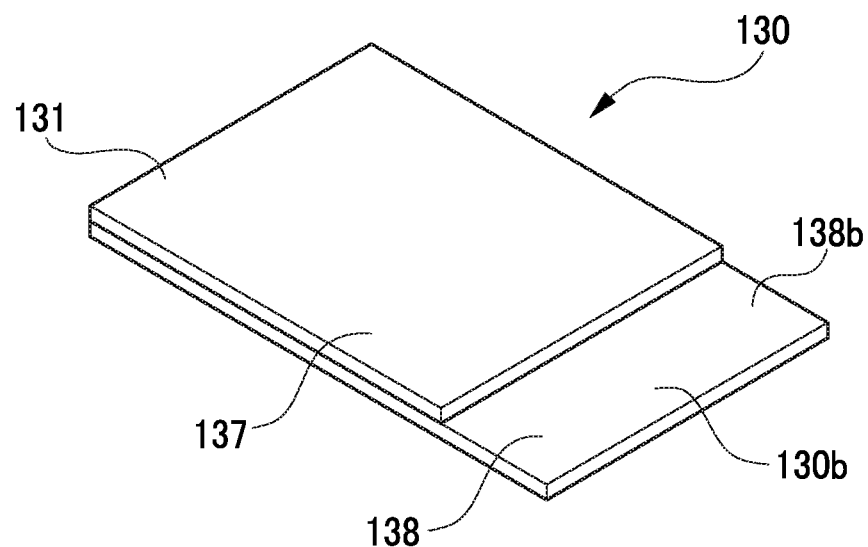
FIG. 1 is a perspective view of a positive electrode in Example 1.
Figure 2:
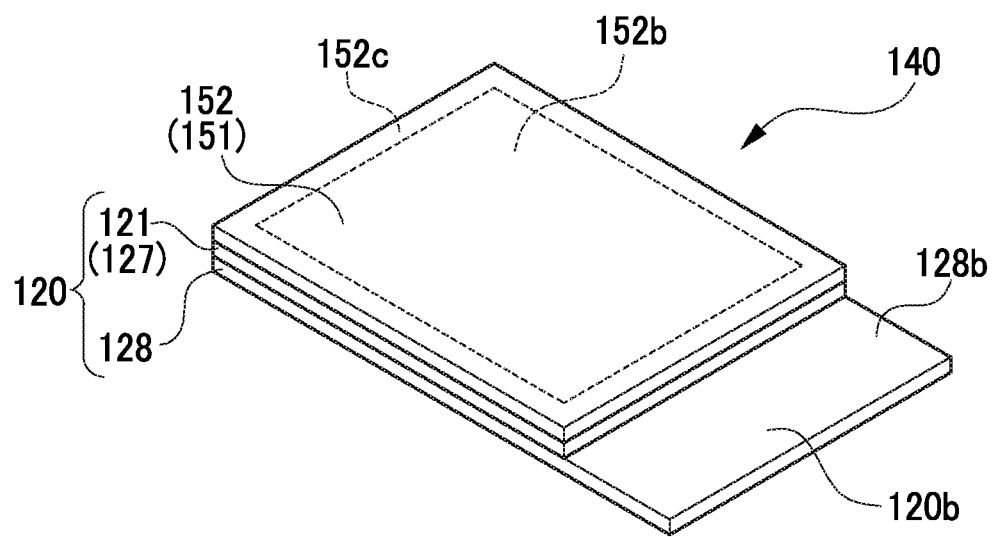
FIG. 2 is a perspective view of a negative electrode with a separator layer (after cutting) in Example 1.
Figure 3:
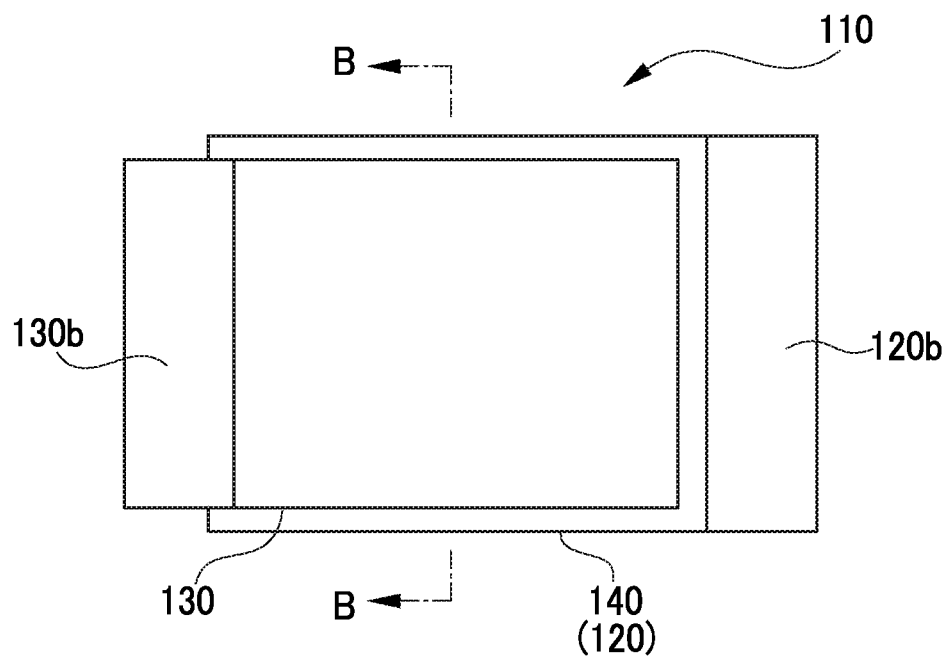
FIG. 3 is a plan view of an electrode body in Example 1.
Figure 4:
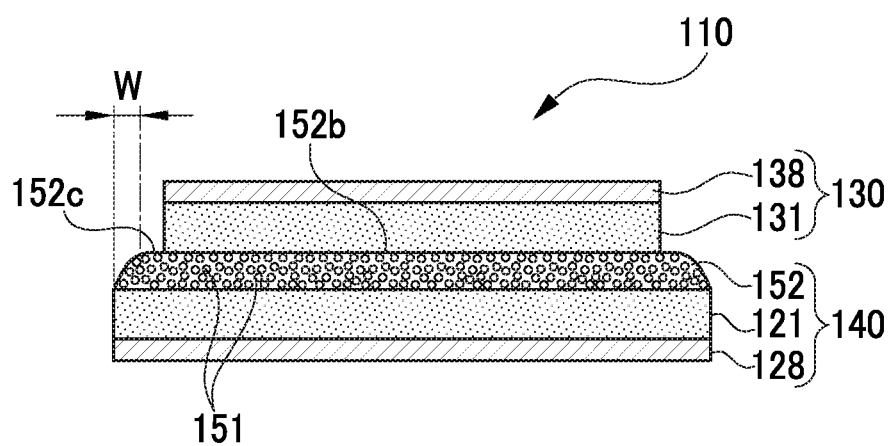
FIG. 4 is a cross-sectional view of the electrode body taken along a line B-B in FIG. 3.
Figure 5:
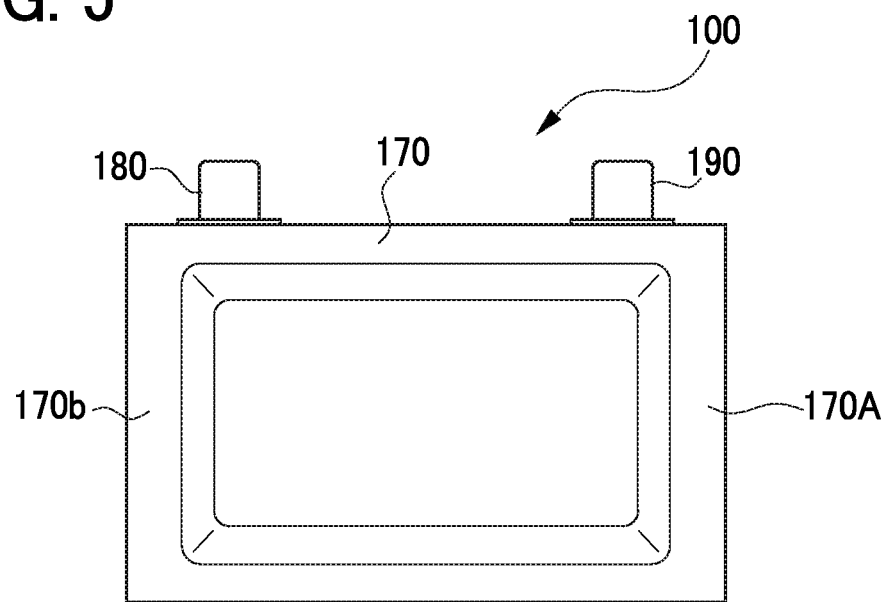
FIG. 5 is a plan view of a lithium ion secondary battery in Example 1.
Figure 6:
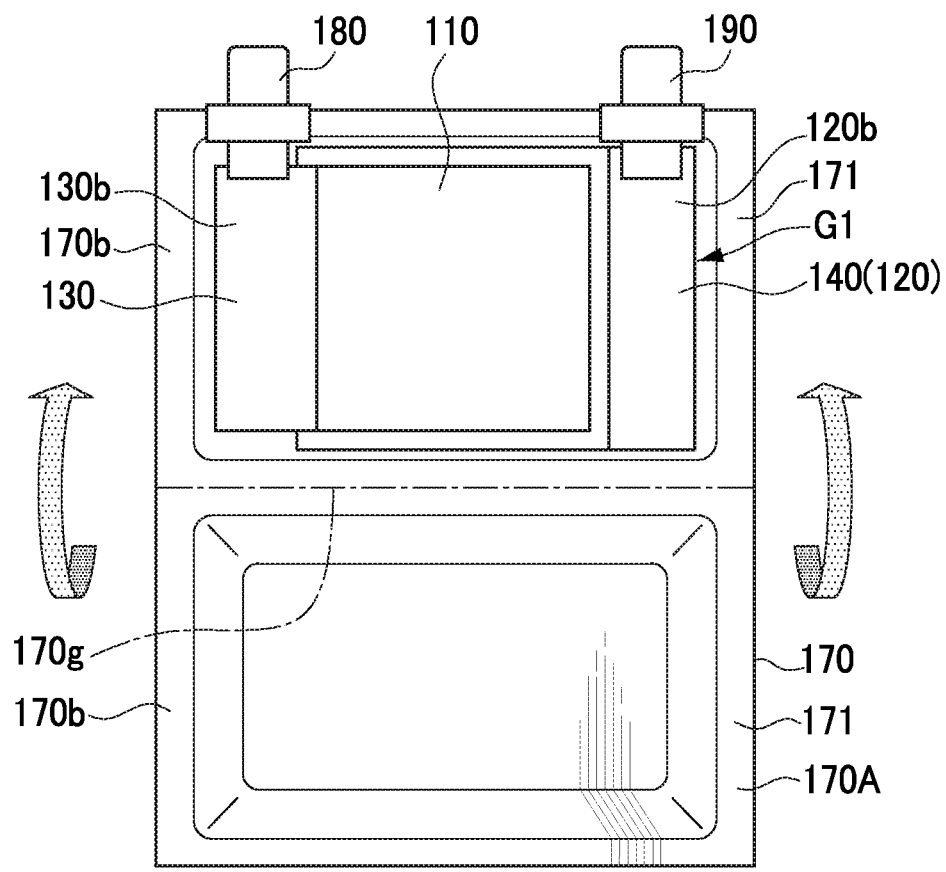
FIG. 6 is a view showing inside of the battery of FIG. 5.

A detailed description of Example 1 which is one of typical embodiments of this disclosure will now be given referring to the accompanying drawings. FIG. 1 is a perspective view of a positive electrode 130 in Example 1. FIG. 2 is a perspective view of a negative electrode 140 with a separator layer (hereinafter, also referred to as a separator layer-coated negative electrode 140) (after cutting) in Example 1. FIG. 3 is a plan view of an electrode body 110 in Example 1. FIG. 4 is a cross-sectional view of the electrode body 110 taken along a line B-B in FIG. 3. FIG. 5 is a plan view of a lithium ion secondary battery 100 in Example 1. FIG. 6 is a view showing the inside of the lithium ion secondary battery 100 in a state where a laminate film 170A forming a battery case 170 is in an open position.

The lithium ion secondary battery 100 in Example 1 is provided, as shown in FIG. 5, with the battery case 170 having a rectangular shape in plan view, a positive terminal 180 extending out of the battery case 170, and a negative terminal 190 extending out of the battery case 170. Further, as shown in FIG. 6, the battery case 170 stores therein the electrode body 110 and an electrolyte (not shown).

The battery case 170 is made of the laminate film 170A consisting of an inner resin film, a metal film, and an outer resin film, which are laminated one on another. This battery case 170 is produced in such a manner that the laminate film 170A having a storage space G1 in which the electrode body 110 is placed is folded along a folding line 170g so that film overlapping portions 170b (peripheral edge portions of the battery case 170) overlap each other, and then the film overlapping portions 170b are thermally welded. Thus, the battery case 170 is formed in a rectangular shape in plan view.

The electrode body 110 is a laminated electrode body including the sheet-shaped (a rectangular sheet-shaped) positive electrode 130 and the sheet-shaped (a rectangular sheet-shaped) separator layer-coated negative electrode 140, which are laminated or stacked in their thickness direction (in a up-and-down direction in FIG. 4) as shown in FIGS. 3 and 4.

The positive electrode 130 includes a positive current collecting member 138 made of an aluminum foil and a front-side positive mixture layer 131 laminated on a front surface 138b of the positive current collecting member 138. The front-side positive mixture layer 131 contains a positive active material 137, a conducting material, and a binder. It is to be noted that a portion not coated with the front-side positive mixture layer 131 in the positive electrode 130 (that is, a portion formed of only the positive current collecting member 138) is referred to as a positive mixture uncoated portion 130b. This positive mixture uncoated portion 130b is connected to the positive terminal 180 (see FIG. 6).

The separator layer-coated negative electrode 140 includes, as shown in FIG. 2, a negative current collecting member 128 made of a copper foil, a front-side negative mixture layer 121 laminated on a front surface 128b of the negative current collecting member 128, and a front-side separator layer 152 laminated on the front-side negative mixture layer 121. The front-side negative mixture layer 121 contains a negative active material 127 made of graphite, a binder made of SBR, and a thickener made of CMC.

In the separator layer-coated negative electrode 140, the negative current collecting member 128 and the front-side negative mixture layer 121 form a negative electrode 120. Specifically, the separator layer-coated negative electrode 140 consists of the negative electrode 120 and the front-side separator layer 152. Further, in the negative electrode 120, a portion not coated with the negative mixture layer 121 (that is, a portion made of only the negative current collecting member 128) is referred to as a negative mixture uncoated portion 120b. This negative mixture uncoated portion 120b is connected to the negative terminal 190 (see FIG. 6).

The front-side separator layer 152 is made of thermoplastic resin particles 151 and a thickener made of CMC. In this Example 1, the thermoplastic resin particles 151 are thermoplastic polyolefin particles (concretely, polyethylene particles).

In Example 1, further, an average diameter D50 of the thermoplastic resin particles 151 (polyethylene particles) is set in a range of 2 to 10 μm. The thickness (i.e., a size in the up-and-down direction in FIG. 4) of the front-side separator layer 152 is set in a range of 10 to 30 μm (e.g., 25 μm). The front-side separator layer 152 contains the thermoplastic resin particles 151 and CMC (the thickener) at a ratio of 99.8:0.2 (ratio by weight).

In Example 1, as shown in FIGS. 3 and 4, the coated area of the front-side negative mixture layer 121 and the coated area of the front-side separator layer 152 are set larger than the coated area of the front-side positive mixture layer 131. In a finished state of the electrode body 110, a part of the front-side separator layer 152, facing, or contacting, the front-side positive mixture layer 131 is referred to as a facing portion 152b and a part of the front-side separator layer 152, not facing, or not contacting, the front-side positive mixture layer 131 is referred to as a non-facing portion 152c (see FIG. 2). That is, the front-side positive mixture layer 131 is absent in an opposite position to the non-facing portion 152c. In this Example 1, as indicated by a broken line in FIG. 2, the non-facing portion 152c is located around the facing portion 152b. The broken line in FIG. 2 represents a boundary line between the non-facing portion 152c and the facing portion 152b.

Figure 7:
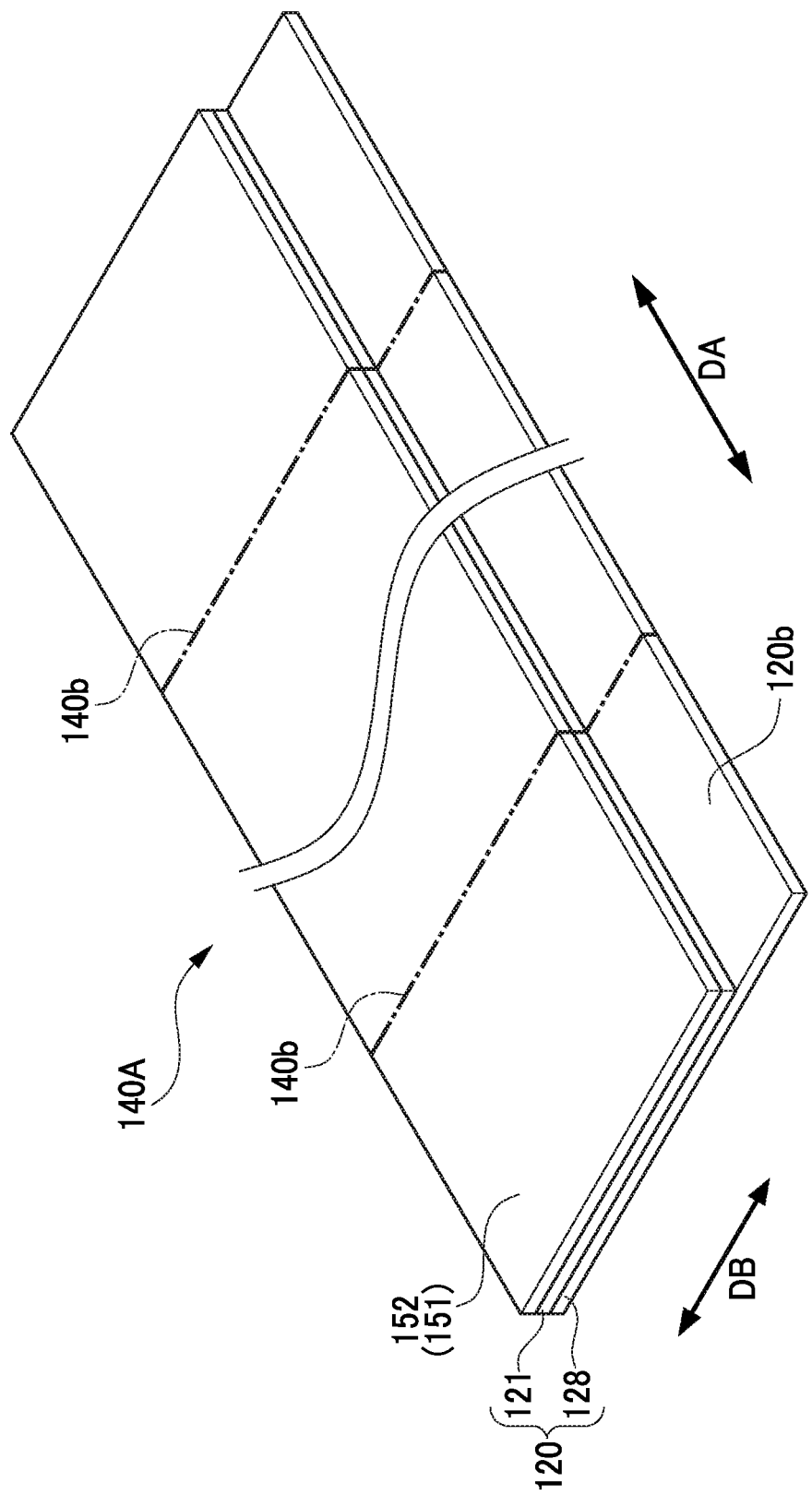
FIG. 7 is a perspective view of a strip-shaped negative electrode with a separator layer (before cutting) in Example 1.
Figure 8:
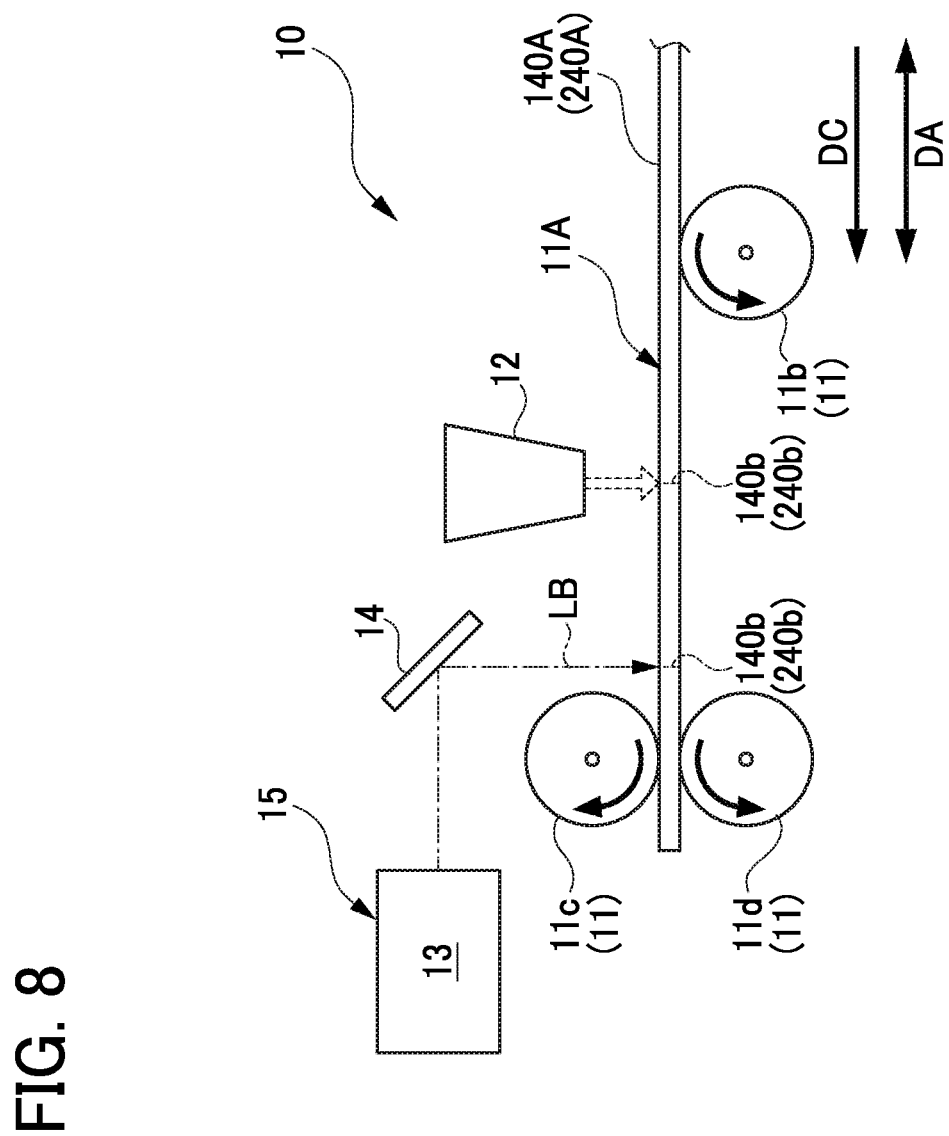
FIG. 8 is a schematic view of a manufacturing apparatus for an electrode with a separator layer in Examples 1 and 2.

Next, a method for manufacturing the separator layer-coated electrode (the separator layer-coated negative electrode 140) in Example 1 will be described below. FIG. 7 is a perspective view of a strip-shaped negative electrode 140A with a separator layer (hereinafter, also referred to as a strip-shaped separator layer-coated negative electrode 140A) (before cutting) in Example 1. FIG. 8 is a schematic view of a manufacturing apparatus 10 for a separator layer-coated electrode (the separator layer-coated negative electrode 140) in Example 1.

The manufacturing apparatus 10 in Example 1 will be first explained. The manufacturing apparatus 10 is an apparatus configured to cut the long strip-shaped separator layer-coated negative electrode 140A with a laser beam LB as shown in FIG. 8 to produce the separator layer-coated negative electrode 140 having a predetermined length (a rectangular sheet shape). The strip-shaped separator layer-coated negative electrode 140A includes, as shown in FIG. 7, the strip-shaped negative current collecting member 128 made of a copper foil, the strip-shaped front-side negative mixture layer 121 laminated on the front surface 128b of the negative current collecting member 128, and the strip-shaped front-side separator layer 152 laminated on the front-side negative mixture layer 121.

This manufacturing apparatus 10 is provided with a conveying device 11 configured to convey the strip-shaped separator layer-coated negative electrode 140A in a direction (referred to as a conveying direction DC) from one side (a right side in FIG. 8) to the other side (a left side in FIG. 8) along a longitudinal direction DA (a right-and-left direction in FIG. 8) of the strip-shaped separator layer-coated negative electrode 140A, at a constant speed, as shown in FIG. 8. This conveying device 11 includes feed rollers 11b, 11c, and 11d for conveying the strip-shaped separator layer-coated negative electrode 140A. Specifically, the conveying device 11 is configured to convey this negative electrode 140A at a constant speed from an upstream side (the right side in FIG. 8) to a downstream side (the left side in FIG. 8) of a conveying line 11A along the longitudinal direction DA.

Further, the manufacturing apparatus 10 is provided with a preheating device 12. This preheating device 12 is configured to preheat the front-side separator layer 152 in the laser irradiation target portion 140b (a target portion to be irradiated with the laser beam LB, that is, a target portion to be cut with the laser beam LB) of the strip-shaped separator layer-coated negative electrode 140A that is being conveyed in the conveying direction DC by the conveying device 11. In this Example 1, the preheating device 12 is an IH heater. The laser irradiation target portion 140b is a portion extending in a width direction DB over the whole width of the strip-shaped separator layer-coated negative electrode 140A (i.e., extending across the strip-shaped separator layer-coated negative electrode 140A along the width direction DB) as shown in FIG. 7.

Further, the manufacturing apparatus 10 is further provided with a laser irradiating device 15 placed in a position on the other side (the left side in FIG. 8) more frontward than the preheating device 12 in the longitudinal direction DA of the strip-shaped separator layer-coated negative electrode 140A that is being conveyed by the conveying device 11. This laser irradiating device 15 is located on the more downstream side (the left side in FIG. 8) than the preheating device 12 in the conveying line 11A. Specifically, the laser irradiating device 15 is placed on a more downstream side than the preheating device 12 in the conveying direction DC. The laser irradiating device 15 includes a laser oscillator 13 and a mirror 14. The laser oscillator 13 is a YAG laser oscillator (LP-MA05 by Panasonic industrial devices SUNX Co., Ltd.) designed to generate a laser beam having a wavelength of 1060 nm.

The laser irradiating device 15 is configured to irradiate a laser beam LB from above the front-side separator layer 152, namely, a front-side separator layer side (an upper side in FIG. 8), to the laser irradiation target portion 140b having the front-side separator layer 152 preheated by the preheating device 12 to cut the strip-shaped separator layer-coated negative electrode 140A, while this negative electrode 140A is being conveyed by the conveying device 11. Thus, the separator layer-coated negative electrode 140 having a predetermined length (a rectangular sheet shape) is produced (see FIG. 2).

Specifically, the laser beam LB generated in the laser oscillator 13 is irradiated and directed to the mirror 14 and reflected by this mirror 14 to irradiate the laser irradiation target portion 140b in which the front-side separator layer 152 has been preheated by the preheating device 12. The strip-shaped separator layer-coated negative electrode 140A is continuously conveyed at a constant speed in the conveying direction DC (in a direction from right to left in FIG. 8).

Thus, the laser irradiation target portion 140b is also moved at the constant speed in the conveying direction DC. Accordingly, the mirror 14 is moved or swung in synchronization with the moving speed of the laser irradiation target portion 140b to irradiate the laser beam LB over the entire laser irradiation target portion 140b.

The manufacturing apparatus 10 in Example 1 configured as above can heat in advance the thermoplastic resin particles 151 constituting the front-side separator layer 152 in the laser irradiation target portion 140b before irradiating the laser beam LB to the laser irradiation target portion 140b by the laser irradiating device 15. Heating the thermoplastic resin particles 151 gives the heat energy to the molecules constituting the thermoplastic resin particles 151, thereby activating the thermal motion of the molecules of the thermoplastic resin particles 151. This enables enhancing the transmittance of the laser beam LB through the front-side separator layer 152 (thermoplastic resin particles 151) in the laser irradiation target portion 140b. This can increase the light quantity (energy quantity) of the laser beam LB allowed to pass through the front-side separator layer 152 and then reach the front-side negative mixture layer 121 and the negative current collecting member 128.

The manufacturing apparatus 10 in Example 1 is configured, as described above, to irradiate the laser beam LB to the laser irradiation target portion 140b from the front-side separator layer 152 side with the enhanced transmittance of the laser beam LB in the front-side separator layer 152 (thermoplastic resin particles 151) in the laser irradiation target portion 140b. The manufacturing apparatus 10 in this Example 1 can thus quickly cut the strip-shaped separator layer-coated negative electrode 140A by use of the laser beam LB.

Figure 9:
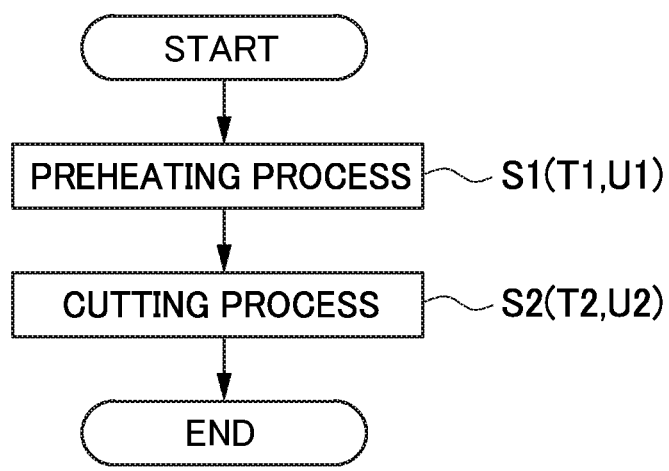
FIG. 9 is a flowchart showing a process flow of a manufacturing method for the electrode with a separator layer in Examples 1 to 3.

Next, a method for manufacturing the separator layer-coated negative electrode 140 in Example 1 will be explained in detail. As shown in FIG. 9, firstly, in step S1 (preheating process), the front-side separator layer 152 in the laser irradiation target portion 140b is preheated. To be concrete, while the strip-shaped separator layer-coated negative electrode 140A is being conveyed by the conveying device 11, the front-side separator layer 152 included in the laser irradiation target portion 140b is heated at a predetermined position (a preheating position) by the preheating device 12 (IH heater).

More specifically, when the laser irradiation target portion 140b of the strip-shaped separator layer-coated negative electrode 140A that is being conveyed by the conveying device 11 reaches the predetermined position (the preheating position), the preheating device 12 (IH heater) is turned ON to heat the front-side separator layer 152 included in the laser irradiation target portion 140b. In this Example 1, for instance, heating of the front-side separator layer 152 in the laser irradiation target portion 140b is performed so that the surface temperature of the front-side separator layer 152 rises to 105° C.

Successively, a process flow advances to step S2 (cutting process) in which, while the strip-shaped separator layer-coated negative electrode 140A is being conveyed by the conveying device 11, the laser beam LB is irradiated to the laser irradiation target portion 140b having the front-side separator layer 152 preheated by the preheating device 12, from the front-side separator layer 152 side (the upper side in FIG. 8), to cut the strip-shaped separator layer-coated negative electrode 140A. Concretely, when the laser irradiation target portion 140b having the front-side separator layer 152 preheated by the preheating device 12 reaches a predetermined position (an irradiating position), the laser beam LB generated in the laser oscillator 13 is irradiated to the mirror 14 and reflected thereby to irradiate the laser irradiation target portion 140b having the front-side separator layer 152 preheated. In this way, the strip-shaped separator layer-coated negative electrode 140A is cut, producing the separator layer-coated negative electrode 140 having a predetermined length (a rectangular sheet shape) (see FIG. 2).

In the manufacturing method in Example 1, as described above, prior to the cutting process (step S2), the preheating process (step S1) is provided to preheat the front-side separator layer 152 in the laser irradiation target portion 140b. Accordingly, just before irradiating the laser beam LB to the laser irradiation target portion 140b in the cutting process (step S2), the thermoplastic resin particles 151 constituting the front-side separator layer 152 in the laser irradiation target portion 140b is heated in advance.

Heating the thermoplastic resin particles 151 gives heat energy to the molecules constituting the thermoplastic resin particles 151, thereby activating the thermal motion of the molecules constituting the thermoplastic resin particles 151. Thus, the transmittance of the laser beam LB through the front-side separator layer 152 (thermoplastic resin particles 151) of the laser irradiation target portion 140b can be enhanced. This can increase the light quantity (energy quantity) of the laser beam LB to pass through the front-side separator layer 152 and then reach the front-side negative mixture layer 121 and the negative current collecting member 128. Consequently, the manufacturing method in this Example 1 enables quick cutting of the strip-shaped separator layer-coated negative electrode 140A with the laser beam LB.

In Example 1, the strip-shaped separator layer-coated negative electrode 140A is produced in the following manner. Specifically, the negative active material 127 (graphite), SBR (styrene-butadiene rubber), and CMC (carboxymethyl cellulose) are mixed in a solvent, preparing negative electrode slurry. Successively, this negative electrode slurry is applied to the front surface 128b of the strip-shaped negative current collecting member 128 made of a copper foil, and then dried and subjected to a press work. The strip-shaped negative electrode 120 is thus obtained, in which the front surface 128b of the negative current collecting member 128 is formed thereon with the front-side negative mixture layer 121.

Subsequently, the front-side separator layer 152 is formed on the front-side negative mixture layer 121 of the strip-shaped negative electrode 120. Firstly, a resin paste is produced by dispersing (or melting) the thermoplastic resin particles 151 (polyethylene particles) and CMC in water. To be concrete, a PE dispersion liquid is produced by dispersing the thermoplastic resin particles 151 (polyethylene particles) in water and then CMC is mixed into this PE dispersion liquid. The resin paste (solid content of 36%) is thus produced. In this Example 1, the ratio (ratio by weight) between the thermoplastic resin particles 151 and CMC (a thickener) contained in the resin paste is set to 99.8:0.2. The PE dispersion liquid used in this Example 1 is Chemiperal™ by Mitsui Chemical Inc.

The resin paste produced as above is applied to the front-side negative mixture layer 121 of the strip-shaped negative electrode 120 and dried, thus forming the front-side separator layer 152. In this Example 1, a known gravure coater is used to apply the aforementioned resin paste to the front surface of the front-side negative mixture layer 121 of the strip-shaped negative electrode 120. Thereafter, the resin paste applied to the front-side negative mixture layer 121 is dried. Thus, the strip-shaped separator layer-coated negative electrode 140A is produced.

Next, a method for manufacturing the lithium ion secondary battery 100 in Example 1 will be described below. The separator layer-coated negative electrode 140 produced as above is first prepared (see FIG. 2). Further, the positive electrode 130 including the positive current collecting member 138 made of an aluminum foil and the front-side positive mixture layer 131 laminated on the front surface 138b of the positive current collecting member 138 is prepared (see FIG. 1). The positive electrode 130 and the separator layer-coated negative electrode 140 are then laminated or stacked in their thickness direction (in the up-and-down direction in FIG. 4), producing a laminated electrode body 110 (see FIGS. 3 and 4).

Thereafter, the positive terminal 180 is welded to the positive mixture uncoated portion 130b of the electrode body 110 and further the negative terminal 190 is welded to the negative mixture uncoated portion 120b. The electrode body 110 connected with the positive terminal 180 and the negative terminal 190 is then disposed in the laminate film 170A (which will form the battery case 170) (see FIG. 6). After the electrode body 110 is placed in the storage space G1, the laminate film 170A is folded along the folding line 170g so that the film overlapping portions 170b overlap each other. These film overlapping portions 170b are then thermally welded, so that the battery case 170 is formed. After that, the electrolyte is poured in the battery case 170. The lithium ion secondary battery 100 is thus completed.

In this Example 1, meanwhile, the coated area of the front-side separator layer 152 is set larger than the coated area of the front-side positive mixture layer 131 (see FIGS. 3 and 4), as described above. To be specific, as indicated by the broken line in FIG. 2, the non-facing portion 152c (a portion that does not face or contact the front-side positive mixture layer 131, i.e., a portion located in a position where the opposite front-side positive mixture layer 131 is not present) of the front-side separator layer 152 is located around the facing portion 152b (a portion that faces or contacts the front-side positive mixture layer 131). With this configuration, the electrode body 110 is designed so that the peripheral edge portion of the positive mixture layer 131 does not contact the negative mixture layer 121 in order to prevent internal short circuit (see FIG. 4).

However, in the cutting process of cutting the strip-shaped separator layer-coated negative electrode 140A with a laser beam, if the laser beam LB is irradiated to this negative electrode 140A for a long time, the heat quantity generated by irradiation of the laser beam LB becomes large, increasing a melt amount (a melt width) of the thermoplastic resin particles 151 constituting the front-side separator layer 152 near a cut surface. In the separator layer-coated negative electrode after subjected to cutting, if the thickness of the front-side separator layer 152 in the vicinity of the cut surface is greatly small, such a thickness-reduced separator layer 152 may cause the peripheral edge portion of the positive mixture layer 131 to contact the negative mixture layer 121.

Figure 17:
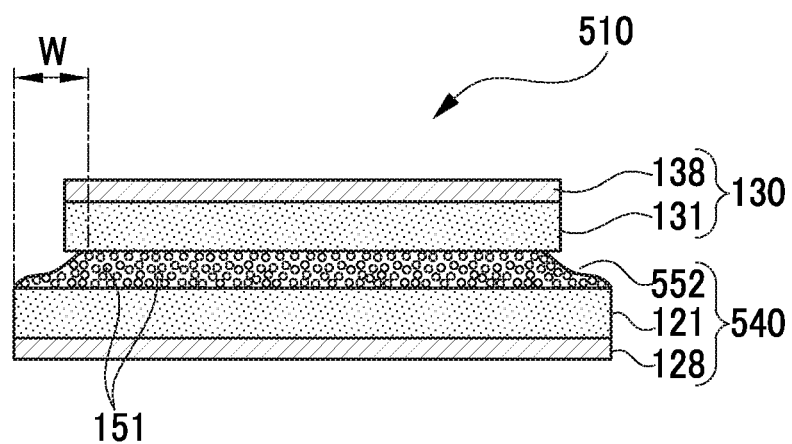
FIG. 17 is a cross sectional view of a conventional electrode body.

For instance, in a conventional art where the laser beam is irradiated from the front-side separator layer side without preheating the front-side separator layer in the laser irradiation target portion, and the strip-shaped separator layer-coated negative electrode is cut to obtain a separator layer-coated negative electrode 540, the transmittance of the laser beam through the front-side separator layer is low and thus it takes long time to cut the strip-shaped separator layer-coated negative electrode. This needs irradiation of the laser beam to the strip-shaped separator layer-coated negative electrode for long time. This long-time irradiation may increase a melt amount (a melt width W) of a front-side separator layer 552 in the vicinity of a cut surface (near a laser irradiation target portion) and greatly decrease the thickness of the front-side separator layer 552 near the cut surface (see FIG. 17). To be specific, a part of the facing portion (a portion facing the positive mixture layer 131 in the thickness direction) of the front-side separator layer 552 may be melted. Accordingly, as shown in FIG. 17, when the positive electrode 130 and the separator layer-coated negative electrode 540 are laminated or slacked in their thickness direction (in an up-and-down direction in FIG. 17) and thereby manufacture a laminated electrode body 510 is manufactured, the peripheral edge portion of the positive mixture layer 131 may contact the negative mixture layer 121.

In Example 1 as described above, in contrast, the front-side separator layer 152 in the laser irradiation target portion 140b is preheated prior to the cutting process (step S2). This enables enhancing the transmittance of the laser beam LB through the front-side separator layer 152 (thermoplastic resin particles 151) of the laser irradiation target portion 140b. This can increase the light quantity (energy quantity) of the laser beam LB allowed to pass through the front-side separator layer 152 and then reach the front-side negative mixture layer 121 and the negative current collecting member 128.

Consequently, the manufacturing method in this Example 1 enables quick cutting of the strip-shaped separator layer-coated negative electrode 140A. Thus, the time needed to irradiate the laser beam LB to the strip-shaped separator layer-coated negative electrode 140A can be reduced. This can reduce the melt amount (the melt width W) of the front-side separator layer 152 in the vicinity of the laser cut surface (i.e., near the laser irradiation target portion 140b) (see FIG. 4). More concretely, the facing portion 152b of the front-side separator layer 152 is prevented from melting. Accordingly, in the laminated electrode body 110 manufactured by laminating the positive electrode 130 and the separator layer-coated negative electrode 140 in their thickness direction, the peripheral edge portion of the positive mixture layer 131 does not contact the negative mixture layer 121.

Example 2

Figure 10:
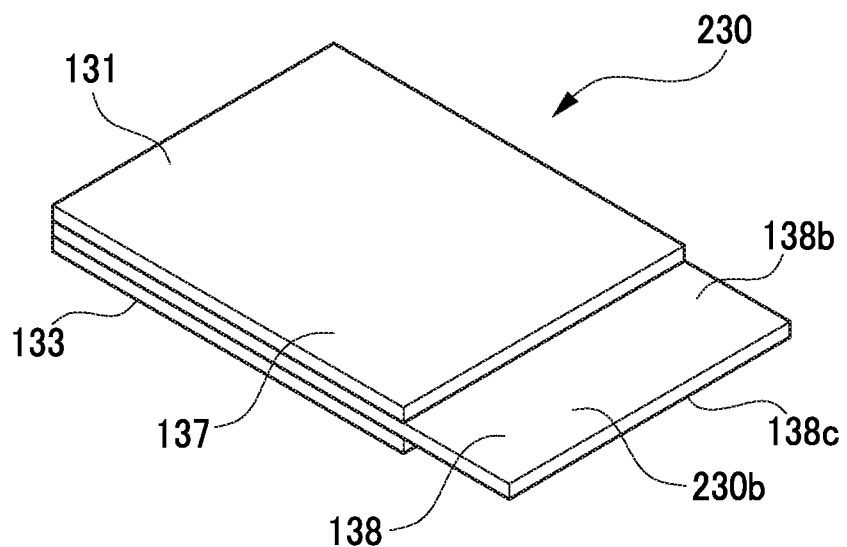
FIG. 10 is a perspective view of a positive electrode in Examples 2 and 3.
Figure 11:
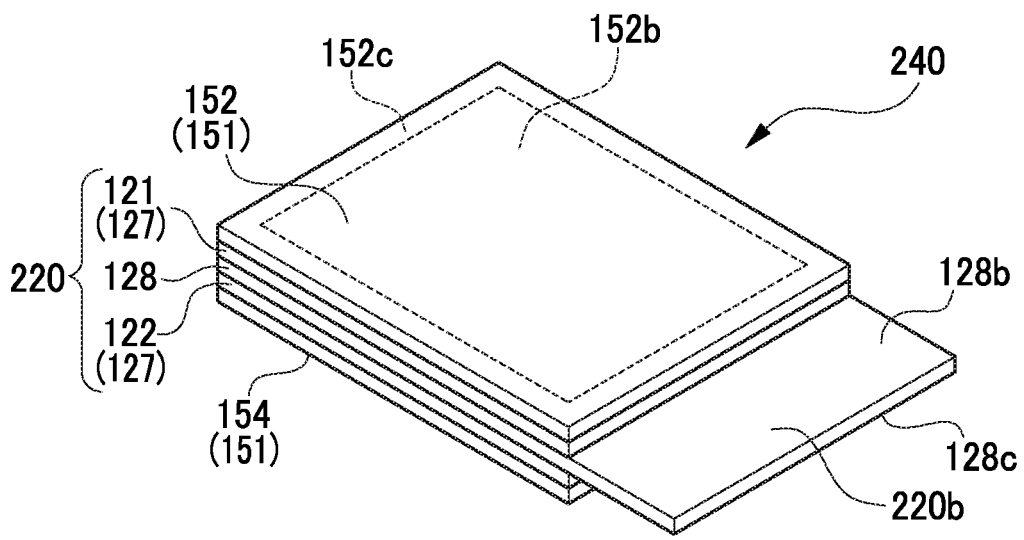
FIG. 11 is a perspective view of a negative electrode with a separator layer (after cutting) in Examples 2 and 3.
Figure 12:
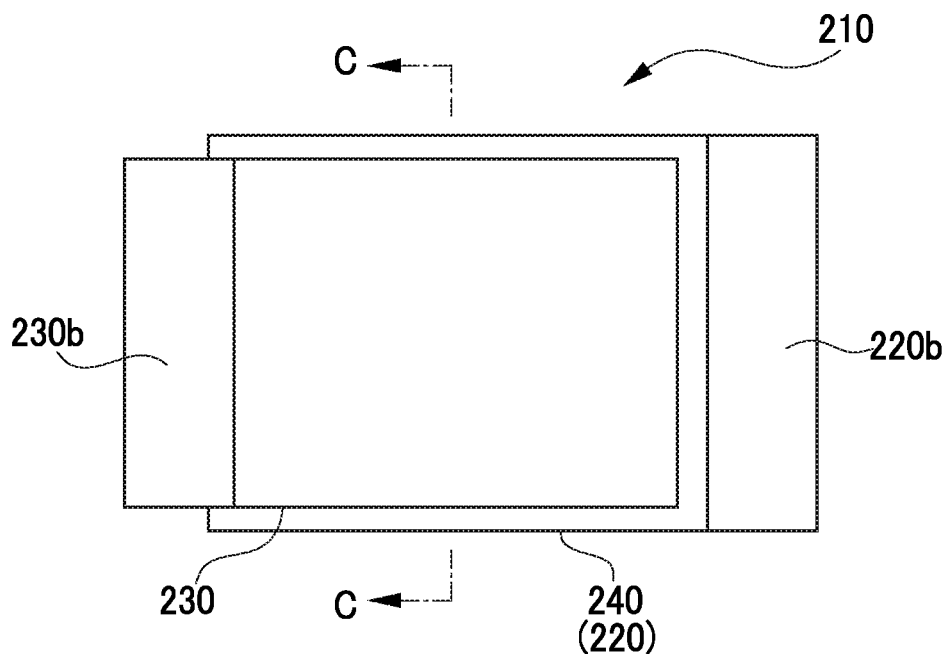
FIG. 12 is a plan view of an electrode body in Examples 2 and 3.
Figure 13:
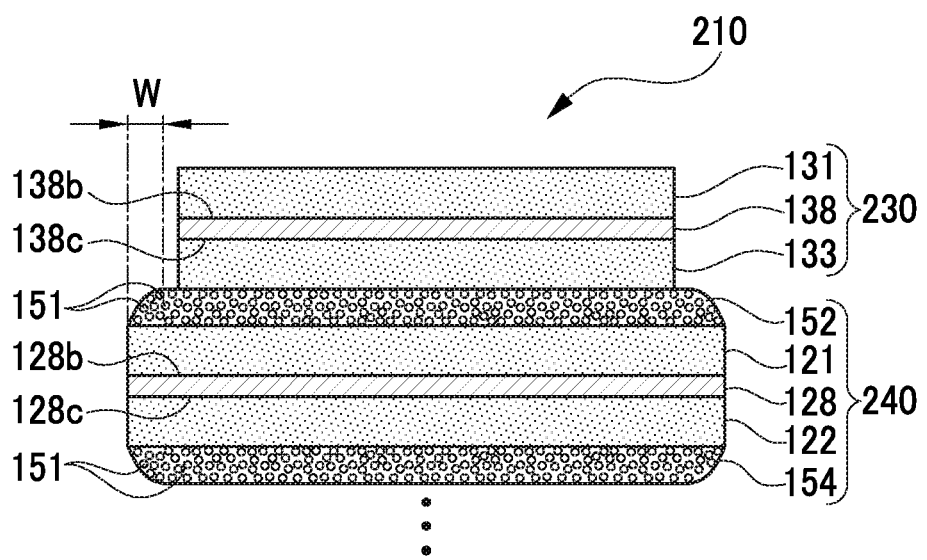
FIG. 13 is a cross-sectional view of the electrode body taken along a line C-C in FIG. 12.
Figure 14:
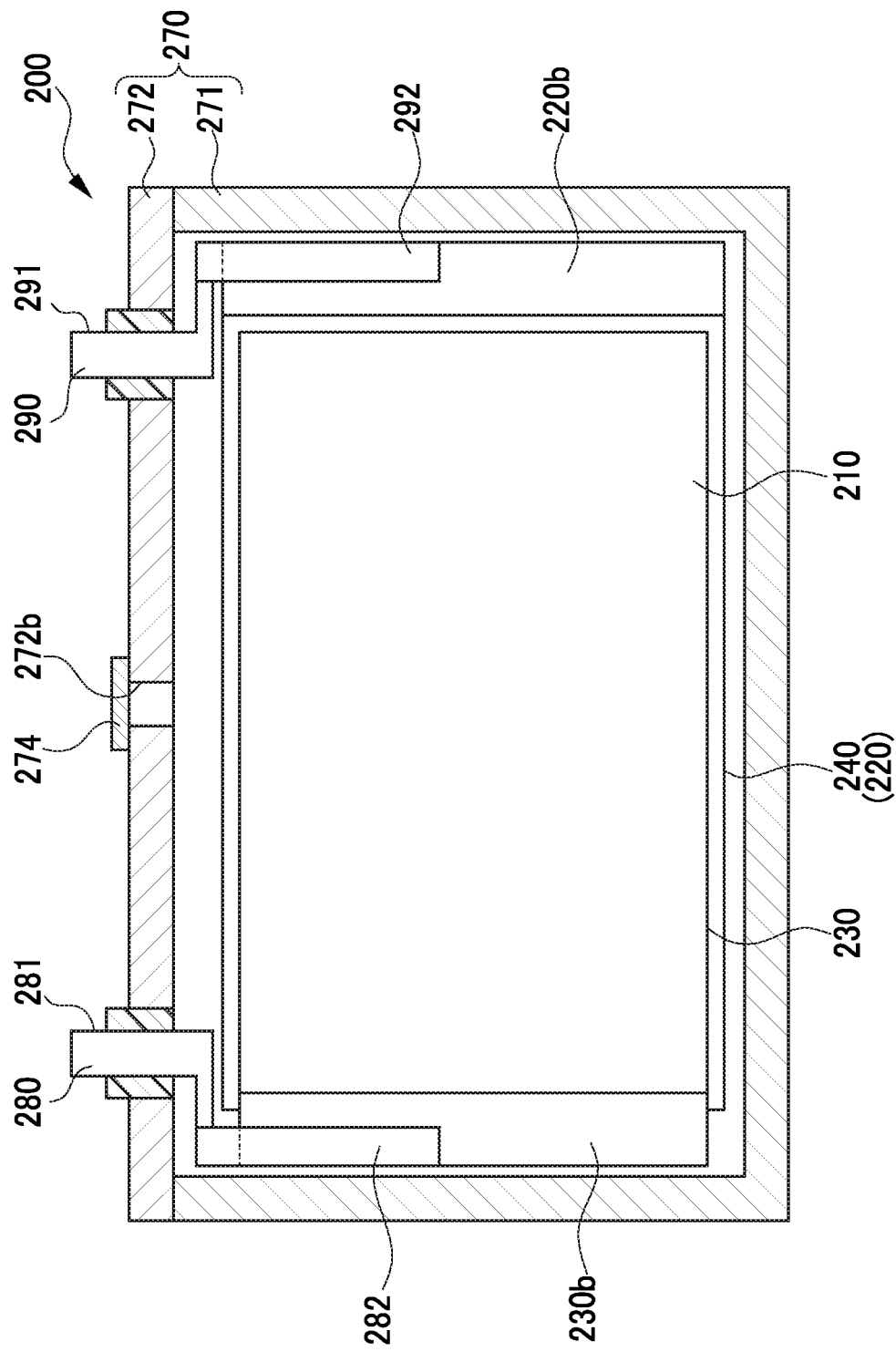
FIG. 14 is a longitudinal cross-sectional view of a lithium ion secondary battery in Examples 2 and 3.

Next, Example 2 of the present disclosure will be described below. FIG. 10 is a perspective view of a positive electrode 230 in Example 2. FIG. 11 is a perspective view of a separator layer-coated negative electrode 240 (after cutting) in Example 2. FIG. 12 is a plan view of an electrode body 210 in Example 2. FIG. 13 is a cross sectional view of the electrode body taken along a line C-C in FIG. 12. FIG. 14 is a longitudinal sectional view of a lithium ion secondary battery 200 in Example 2.

The lithium ion secondary battery 200 in Example 2 is provided with the electrode body 210 and a battery case 270 that stores therein the electrode body 210 as shown in FIG. 14. The battery case 270 is made of aluminum and formed in a rectangular parallelepiped shape. This battery case 270 includes a battery case body 271 and a closing lid 272.

The battery case body 271 has a rectangular box-like shape with a closed bottom. Between the battery case body 271 and the electrode body 210, there is interposed an insulating film (not shown) folded in a box-like shape. The closing lid 272 has a rectangular plate-like shape, which is welded to the battery case body 271 to close the opening of the battery case body 271. In this closing lid 272, a rectangular plate-like safety valve 274 is sealingly mounted.

The electrode body 210 is a laminated electrode body in which the sheet-shaped (a rectangular sheet-shaped) positive electrode 230 and the sheet-shaped (a rectangular sheet-shaped) separator layer-coated negative electrode 240, which are laminated or stacked in their thickness direction (in an up-and-down direction in FIG. 13) as shown in FIGS. 12 and 13. In this Example 2, a plurality of sheets of the positive electrodes 230 and a plurality of sheets of the separator layer-coated negative electrodes 240 are alternately laminated. That is, the electrode body 210 includes a plurality of sets, each consisting of one positive electrode 230 and one separator layer-coated negative electrode 240.

The positive electrode 230 in Example 2 is identical to the positive electrode 130 in Example 1, except that the positive electrode 230 includes a positive mixture layer (a back-side positive mixture layer 133) formed on the back surface 138*c* of the positive current collecting member 138 in addition to the positive mixture layer formed on the front surface 138*b*. Specifically, the positive electrode 230 is a double-sided laminated positive electrode, as shown in FIG. 10, including the positive collecting member 138 made of an aluminum foil, the front-side positive mixture layer 131 laminated on the front surface 138*b* of the positive current collecting member 138, and the back-side positive mixture layer 133 laminated on the back surface 138*c* of the positive current collecting member 138.

The separator layer-coated negative electrode 240 in this Example 2 is identical to the separator layer-coated negative electrode 140 in Example 1, except that this negative electrode 240 includes a negative mixture layer (a back-side negative mixture layer 122) and a separator layer (a back-side separator layer 154) formed on the back surface 128*c* of the negative current collecting member 128 in addition to the negative mixture layer and the separator layer formed on the front surface 128*b*. Specifically, the separator layer-coated negative electrode 240 is a double-sided laminated, separator layer-coated negative electrode, as shown in FIG. 11, including the negative current collecting member 128 made of a copper foil, the front-side negative mixture layer 121 laminated on the front surface 128*b* of the negative current collecting member 128, the front-side separator layer 152 laminated on the front-side negative mixture layer 121, the back-side negative mixture layer 122 laminated on the back surface 128*c* of the negative current collecting member 128, and the back-side separator layer 154 laminated on the back-side negative mixture layer 122.

Further, as shown in FIG. 14, a positive connecting portion 282 of a positive terminal member 280 is welded to the positive electrode 230 (i.e., a positive mixture uncoated portion 230*b*) of the electrode body 210. In addition, a negative connecting portion 292 of a negative terminal member 290 is welded to the negative electrode 120 (i.e., a negative mixture uncoated portion 220*b*). The positive terminal member 280 and the negative terminal member 290 respectively include, at their leading ends, a positive terminal portion 281 and a negative terminal portion 291, each penetrating through the closing lid 272 to protrude outside.

Figure 15:
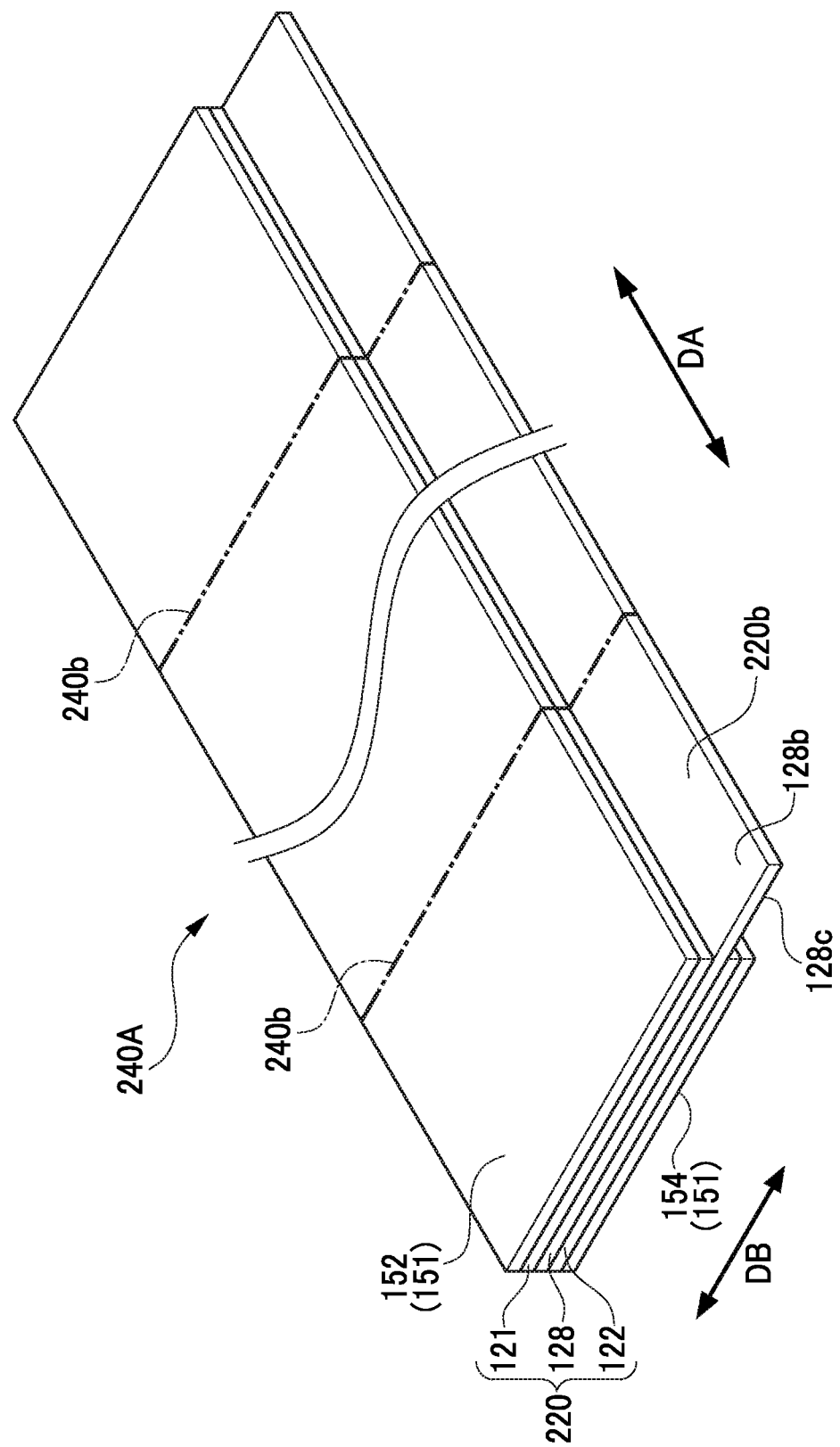
FIG. 15 is a perspective view of a strip-shaped negative electrode with a separator layer (before cutting) in Examples 2 and 3.

Next, a method for manufacturing the separator layer-coated electrode (the separator layer-coated negative electrode 240) in Example 2 will be explained below. FIG. 15 is a perspective view of a strip-shaped separator layer-coated negative electrode 240A (before cutting) in Example 2. This negative electrode 240A is a strip-shaped separator layer-coated negative electrode having a double-sided laminated configuration, which includes as shown in FIG. 15 the strip-shaped negative current collecting member 128 made of a copper foil, the strip-shaped front-side negative mixture layer 121 laminated on the front surface 128*b* of the negative current collecting member 128, the strip-shaped front-side separator layer 152 laminated on the front-side negative mixture layer 121, the strip-shaped back-side negative mixture layer 122 laminated on the back surface 128*c* of the negative current collecting member 128, and the strip-shaped back-side separator layer 154 laminated on the back-side negative mixture layer 122.

In Example 2, the separator layer-coated negative electrode 240 is produced by use of the manufacturing apparatus 10 (see FIG. 8) as in Example 1. To be concrete, as shown in FIG. 9, in step T1 (preheating process), the front-side separator layer 152 in the laser irradiation target portion 240 is preheated. Specifically, while the strip-shaped separator layer-coated negative electrode 240A is being conveyed by the conveying device 11, the front-side separator layer 152 included in a laser irradiation target portion 240*b* is heated at a predetermined position (a preheating position) by the preheating device 12 (IH heater). Also in this Example 2, similar to Example 1, the heating of the front-side separator layer 152 in the laser irradiation target portion 240*b* is performed so that the surface temperature of the front-side separator layer 152 rises to 105° C.

Successively, a process flow advances to step T2 (cutting process) in which, while the strip-shaped separator layer-coated negative electrode 240A is being conveyed by the conveying device 11, the laser beam LB is irradiated to the laser irradiation target portion 240 having the front-side separator layer 152 preheated by the preheating device 12 in a direction (from above to below in FIG. 8) from the front-side separator layer 152 side (the upper side in FIG. 8) to the negative current collecting member 128 side (a lower side in FIG. 8) as in Example 1, thereby cutting the strip-shaped separator layer-coated negative electrode 240A. Thus, the separator layer-coated negative electrode 240 having a predetermined length (a rectangular sheet shape) is produced (see FIG. 11).

Also in this Example 2, as in Example 1, in the prior preheating process (step T1), the transmittance of the laser beam LB in the front-side separator layer 152 (the thermoplastic resin particles 15) of the laser irradiation target portion 240 is enhanced in advance. In the cutting process (step T2), accordingly, the light quantity (energy quantity) of the laser beam LB allowed to pass through the front-side separator layer 152 and then reach the front-side negative mixture layer 121, the negative current collecting member 128, and the back-side negative mixture layer 122 can be increased. Also in this Example 2, consequently, the double-sided laminated strip-shaped separator layer-coated negative electrode 240A is quickly cut.

(Cutting Test)

Next, seven sheets of double-sided laminated separator layer-coated negative electrodes 240 (samples 1 to 7) were prepared and subjected to a cutting test under different conditions (different preheating conditions). Those separator layer-coated negative electrode sheets 240 (samples 1 to 7) are 100 mm in width (corresponding to the length of the laser irradiation target portion).

Sample 1 was subjected to the cutting process without undergoing the preheating process. Concretely, the laser irradiation target portion was not heated by the preheating device 12 and was directly subjected to irradiation of a laser beam applied from the front-side separator layer 152 side by the laser irradiating device 15 in a temperature environment of 25° C. The separator layer-coated negative electrode 240 in sample 1 was thus cut out. The surface temperature of the front-side separator layer 152 in sample 1 just before the cutting process was 25° C.

Further, the transmittance of the laser beam LB (wavelength: 1060 nm) in the front-side separator layer 152 (surface temperature: 25° C.) in sample 1 just before the cutting process was determined in the following manner. Concretely, a sample A was produced in which a front-side separator layer 152 was formed on a colorless and transparent glass plate. This sample A was subjected to irradiation of the light having a wavelength of 1060 nm by a known spectrophotometer in a temperature environment of 25° C. The light transmittance of the front-side separator layer 152 was measured, resulting in a transmittance of 10%. From this result, it is considered that the transmittance of the laser beam LB (wavelength: 1060 nm) in the front-side separator layer 152 (surface temperature: 25° C.) in sample 1 just before the cutting process is 10%.

The sample 1 was then subjected to the cutting process. This cutting took 1.0 second. Specifically, the laser beam LB was irradiated for 1.0 second to the laser irradiation target portion from the front-side separator layer 152 side by the laser irradiating device 15, so that the separator layer-coated negative electrode 240 in sample 1 was completely cut out. After cutting, further, the melt width W of the front-side separator layer 152 (see FIG. 13) in the vicinity of the cut surface in sample 1 (in the vicinity of the laser irradiation target portion) was measured, resulting in W=4.2 mm.

In contrast, sample 2 was subjected to the preheating process and then the cutting process. Specifically, the laser irradiation target portion was heated by the preheating device 12 until the surface temperature of the front-side separator layer 152 in the laser irradiation target portion rises to 70° C. Subsequently, the laser beam was irradiated to the laser irradiation target portion from the front-side separator layer 152 side by the laser irradiating device 15, thereby cutting out the separator layer-coated negative electrode 240 in sample 2.

Further, the transmittance of the laser beam LB (wavelength: 1060 nm) in the front-side separator layer 152 (surface temperature: 70° C.) in sample 2 just before the cutting process was determined in the following manner. Concretely, a sample B was produced in which a front-side separator layer 152 was formed on a colorless and transparent glass plate. The front-side separator layer 152 in this sample B was heated by the preheating device 12 until the surface temperature of the front-side separator layer 152 rises to 70° C. Then the sample B with the front-side separator layer 152 heated was subjected to irradiation of the light having a wavelength of 1060 nm by a known spectrophotometer. The light transmittance of the front-side separator layer 152 was measured, resulting in a transmittance of 55%. From this result, it is considered that the transmittance of the laser beam LB (wavelength: 1060 nm) in the front-side separator layer 152 (surface temperature: 70° C.) in sample 2 just before the cutting process is 55%.

This sample 2 was then subjected to the cutting process. This cutting took 0.3 second. Specifically, the laser beam LB was irradiated for 0.3 second to the laser irradiation target portion from the front-side separator layer 152 side by the laser irradiating device 15, so that the separator layer-coated negative electrode 240 in sample 2 was completely cut out. After cutting, further, the melt width W of the front-side separator layer 152 (see FIG. 13) in the vicinity of the cut surface of sample 2 (in the vicinity of the laser irradiation target portion) was measured, resulting in W=0.3 mm.

Sample 3 was subjected to the preheating process and then the cutting process as with sample 2. This sample 3 underwent the test under the same test condition as that for sample 2 except that the surface temperature of the front-side separator layer 152 in the laser irradiation target portion in sample 3 was set to 85° C. in the preheating process. This adjusting of the surface temperature of the front-side separator layer 152 in the laser irradiation target portion in the preheating process was performed by changing the output of the preheating device 12.

This sample 3 was measured, as with sample 2, in transmittance of the laser beam LB (wavelength: 1060 nm) in the front-side separator layer 152 (surface temperature: 85° C.) just before the cutting process, resulting in a transmittance of 60%. This sample 3 was then subjected to the cutting process. This cutting took 0.3 second. After cutting, further, the melt width W of the front-side separator layer 152 in the vicinity of the cut surface of the sample 3 (in the vicinity of the laser irradiation target portion) was measured, resulting in W=0.3 mm.

Further, samples 4 to 7 were also subjected to the preheating process and then the cutting process. These samples 4 to 7 underwent the test under the same test condition as that for sample 2 except that the surface temperature of the front-side separator layer 152 in the laser irradiation target portion in each of samples 4-7 was set different from the surface temperature of sample 2 in the preheating process. To be concrete, the preheating process was conducted to raise the surface temperature of the front-side separator layer 152 in the laser irradiation target portion to 105° C. in sample 4, 135° C. in sample 5, 155° C. in sample 6, and 175° C. in sample 7.

Those samples 4 to 7 were measured, as with sample 2, in transmittance of the laser beam LB (wavelength: 1060 nm) in the front-side separator layer 152 (surface temperature: 105° C. to 175° C.) just before the cutting process, each resulting in a transmittance of 65%. The samples 4 to 7 were then subjected to the cutting process. For each sample, this cutting took 0.2 second. After cutting, further, the melt width W of the front-side separator layer 152 in the vicinity of the cut surface of each of samples 4 to 7 (in the vicinity of the laser irradiation target portion) was measured, resulting in W=0.2 mm. The test results mentioned above are shown in Table 1.

TABLE 1

|  | Presence of Preheating (Y/N) | Surface Temperature (° C.) | Transmission (%) | Cutting Time (seconds) | Melt Width (mm) |
| --- | --- | --- | --- | --- | --- |
| Sample 1 | No | 25 | 10 | 1.0 | 4.2 |
| Sample 2 | Yes | 70 | 55 | 0.3 | 0.3 |
| Sample 3 | Yes | 85 | 60 | 0.3 | 0.3 |
| Sample 4 | Yes | 105 | 65 | 0.2 | 0.2 |
| Sample 5 | Yes | 135 | 65 | 0.2 | 0.2 |
| Sample 6 | Yes | 155 | 65 | 0.2 | 0.2 |
| Sample 7 | Yes | 175 | 65 | 0.2 | 0.2 |

From the results shown in Table 1, it is revealed that, when the preheating process is performed prior to the cutting process, a strip-shaped separator layer-coated negative electrode can be cut quickly. Specifically, by heating a front-side separator layer in a laser irradiation target portion before irradiating a laser beam to the laser irradiation target portion to cut a strip-shaped separator layer-coated negative electrode, it is possible to enhance the laser beam transmittance in the front-side separator layer in the laser irradiation target portion, thereby enabling quick cutting of the strip-shaped separator layer-coated negative electrode.

The reason of the above results is considered because heating the front-side separator layer heats the thermoplastic resin particles 151 included in the front-side separator layer, giving heat energy to the molecules constituting the thermoplastic resin particles 151, thereby activating the thermal motion of the molecules constituting the thermoplastic resin particles 151. Accordingly, it is considered that the transmittance of the laser beam LB in the front-side separator layer 152 (thermoplastic resin particles 151) of the laser irradiation target portion 140 can be enhanced, thus increasing the light quantity (energy quantity) of the laser beam LB allowed to pass through the front-side separator layer 152 and then reach the front-side negative mixture layer 121 and the negative current collecting member 128. As a result, it is thus considered that the strip-shaped separator layer-coated negative electrode can be cut quickly.

From the results in Table 1, it is also revealed that, when the preheating process is performed prior to the cutting process, the melt width W of the front-side separator layer 152 in the vicinity of a laser cut surface (i.e., in the vicinity of the laser irradiation target portion) can be made small. This is because, since the time required to cut the strip-shaped separator layer-coated negative electrode is reduced, the irradiation time of the laser beam LB to the strip-shaped separator layer-coated negative electrode can be shortened. It is thus considered that the heat quantity to be generated in the strip-shaped separator layer-coated negative electrode by irradiation of the laser beam LB can be reduced and hence the melt with W of the front-side separator layer 152 can be made small.

Since the melt width W of the front-side separator layer 152 is made small in the above manner, when the positive electrode 130 (230) and the separator layer-coated negative electrode 140 (240) are laminated one on the other in their thickness direction to produce a laminated electrode body 110 (210), the peripheral edge portion of the positive mixture layer 131 can be prevented from contacting the negative mixture layer 121 (see FIGS. 4 and 13). It is thus considered that the lithium ion secondary battery 100 (200) can prevent internal short circuit.

In view of the above description, it is preferable to heat the front-side separator layer in the laser irradiation target portion until the surface temperature of the front-side separator layer rises to a temperature in a range of 70° C. to 175° C. and more preferable to heat the front-side separator layer in the laser irradiation target portion until the surface temperature of the same rises to a temperature in a range of 105° C. to 175° C.

Example 3

Next, Example 3 of the present disclosure will be described below. Example 3 is similar to Example 2 except for only part of the manufacturing apparatus and manufacturing method for the separator layer-coated negative electrode. Therefore the following description is given with a focus on different points from Example 2 and thus similar or identical points to Example 2 are omitted or simplified.

Figure 16:
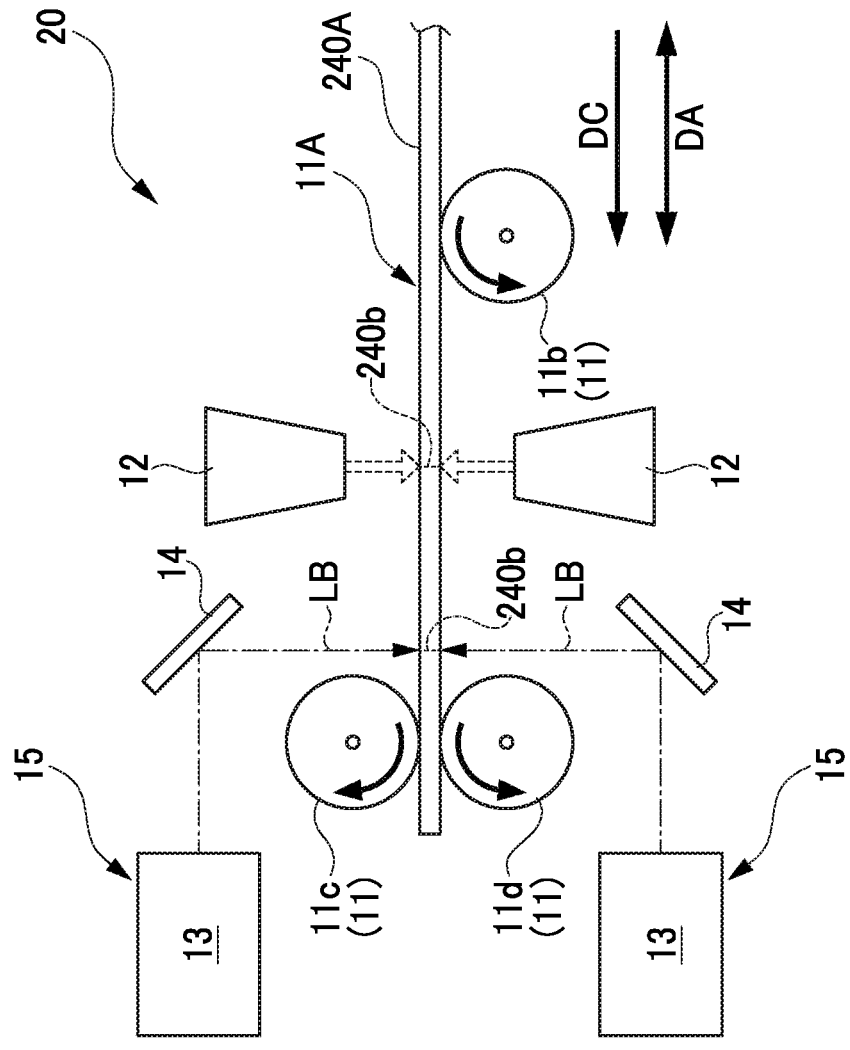
FIG. 16 is a schematic view of a manufacturing apparatus for the electrode with a separator layer in Example 3.

Firstly, a method for manufacturing a separator layer-coated electrode (the separator layer-coated negative electrode 240) in Example 3 will be explained. FIG. 15 is a perspective view of the strip-shaped separator layer-coated negative electrode 240A (before cutting) in Example 3. FIG. 16 is a schematic view of a manufacturing apparatus 20 for the separator layer-coated electrode (the separator layer-coated negative electrode 240) in Example 3.

The manufacturing apparatus 20 in this Example 3 will be first explained. The manufacturing apparatus 20 in Example 3 is identical to the manufacturing apparatus 10 in Example 1 except that the manufacturing apparatus 20 is provided with a preheating device 12 and a laser irradiating device 15 for the back surface side of the strip-shaped separator layer-coated negative electrode 240A that is being conveyed by the conveying device 11 in addition to the preheating device 12 and another laser irradiating device 15 for the front surface side.

This manufacturing apparatus 20 is further provided with the conveying device 11 configured to convey the strip-shaped separator layer-coated negative electrode 240A in a direction from an upstream side (a right side in FIG. 16) to a downstream side (a left side in FIG. 16) of the conveying line 11A along the longitudinal direction DA at a constant speed, as shown in FIG. 16. The strip-shaped separator layer-coated negative electrode 240A includes, as shown in FIG. 15, the strip-shaped negative current collecting member 128 made of a copper foil, the strip-shaped front-side negative mixture layer 121 laminated on the front surface 128b of the negative current collecting member 128, the strip-shaped front-side separator layer 152 laminated on the front-side negative mixture layer 121, the strip-shaped back-side negative mixture layer 122 laminated on the back surface 128c of the negative current collecting member 128, and the strip-shaped back-side separator layer 154 laminated on the back-side negative mixture layer 122.

Furthermore, the manufacturing apparatus 20 is provided with the preheating device 12 (IH heater) to preheat the front-side separator layer 152 in the laser irradiation target portion 240b of the strip-shaped separator layer-coated negative electrode 240A that is being conveyed by the conveying device 11, and another preheating device 12 (IH heater) to preheat the back-side separator layer 154 in the laser irradiation target portion 240b. Those two preheating devices 12 and 12 are placed in symmetrical positions in a thickness direction (an up-and-down direction in FIG. 16) of the strip-shaped separator layer-coated negative electrode 240A. The laser irradiation target portion 240b is a portion extending in a width direction DB over the whole width of the strip-shaped separator layer-coated negative electrode 240A (i.e., extending across the strip-shaped separator layer-coated negative electrode 140A along the width direction DB), as shown in FIG. 15.

The manufacturing apparatus 20 is further provided with the laser irradiating device 15 to irradiate the laser beam LB from the front-side separator layer 152 side (an upper side in FIG. 16) and another laser irradiating device 15 to irradiate the laser beam LB from the back-side separator layer 154 side (a lower side in FIG. 16) to the laser irradiation target portion 140b having the front-side separator layer 152 and the back-side separator layer 154 both preheated by the preheating devices 12, while the strip-shaped separator layer-coated negative electrode 240A is being conveyed by the conveying device 11. These two laser irradiating devices 15 and 15 are placed in symmetrical positions on a more downstream side (a left side in FIG. 16) than the preheating devices 12 in the conveying line 11A (in the conveying direction DC) and in a thickness direction (the up-and-down direction in FIG. 16) of the strip-shaped separator layer-coated negative electrode 240A.

Accordingly, the manufacturing apparatus 20 in Example 3 causes the laser irradiating devices 15 and 15 to irradiate the laser irradiation target portion 240b of the strip-shaped separator layer-coated negative electrode 240A with the laser beams LB traveling from both the front-side separator layer 152 side and the back-side separator layer 154 side toward the negative current collecting member 128, thereby cutting the strip-shaped separator layer-coated negative electrode 240A. In the above manner, since the laser beams LB are irradiated from both the front-side separator layer 152 side and the back-side separator layer 154 side, the strip-shaped separator layer-coated negative electrode 240A can be cut quickly.

In the manufacturing apparatus 20 in Example 3, additionally, both the front-side separator layer 152 and the back-side separator layer 154 in the laser irradiation target portion 240b are heated by the preheating devices 12 and 12. This enables enhancing in advance the transmittance of the laser beam LB in the front-side separator layer 152 (the thermoplastic resin particles 151 contained therein) and the back-side separator layer 154 (the thermoplastic resin particles 151 contained therein) of the laser irradiation target portion 240b. This enhanced transmittance in the separator layers 152 and 154 can increase the light quantity (energy quantity) of the laser beam LB allowed to pass through the front-side separator layer 152 and then reach the front-side negative mixture layer 121 and the negative current collecting member 128 and also the light quantity (energy quantity) of the laser beam LB allowed to pass through the back-side separator layer 154 and then reach the back-side negative mixture layer 122 and the negative current collecting member 128. Consequently, the manufacturing apparatus 20 in Example 2 can cut the strip-shaped separator layer-coated negative electrode 240A more quickly than the manufacturing apparatus 10 in Example 1.

A method for manufacturing the separator layer-coated electrode (the separator layer-coated negative electrode 240) in Example 3 will be explained below. In step U1 (preheating process), as shown in FIG. 9, the front-side separator layer 152 and the back-side separator layer 154 in the laser irradiation target portion 240b of the strip-shaped separator layer-coated negative electrode 240A are preheated. Specifically, the front-side separator layer 152 and the back-side separator layer 154 included in the laser irradiation target portion 240b are heated at a predetermined position (a preheating position) by use of the preheating devices 12 and 12, while the strip-shaped separator layer-coated negative electrode 240A is being conveyed by the conveying device 11. Also in Example 3, as in Example 1, for instance, the front-side separator layer 152 and the back-side separator layer 154 included in the laser irradiation target portion 240b are heated to a surface temperature of 105° C.

In step U2 (cutting process), successively, while the strip-shaped separator layer-coated negative electrode 240A is being conveyed by the conveying device 11, the laser beams LB are irradiated to the laser irradiation target portion 240b having the front-side separator layer 152 and the back-side separator layer 154 preheated by the preheating devices 12 and 12, from both the front-side separator layer 152 side (the upper side in FIG. 8) and the back-side separator layer 154 side (the lower side in FIG. 8), thereby cutting the strip-shaped separator layer-coated negative electrode 240A. Thus, the separator layer-coated negative electrode 240 having a predetermined length (a rectangular sheet shape) is produced (see FIG. 11).

In Example 3, in the cutting process (step U2), the laser beams LB are irradiated to the laser irradiation target portion 240b of the double-sided laminated strip-shaped separator layer-coated negative electrode 240A from both the front-side separator layer 152 side and the back-side separator layer 154 side toward the negative current collecting member 128, to cut the strip-shaped separator layer-coated negative electrode 240A. In this manner, since the laser beams LB are irradiated from both the front-side separator layer 152 side and the back-side separator layer 154 side, the strip-shaped separator layer-coated negative electrode 240A can be cut quickly.

In Example 3, the preheating process (step U1), both the front-side separator layer 152 and the back-side separator layer 154 in the laser irradiation target portion 240b are heated. This enables enhancing in advance the laser beam transmittance in the front-side separator layer 152 (the thermoplastic resin particles 151 contained therein) and the back-side separator layer 154 (the thermoplastic resin particles 151 contained therein) in the laser irradiation target portion 240b. This can increase, in the cutting process (step U2), the light quantity (energy quantity) of the laser beam LB allowed to pass through the front-side separator layer 152 and then reach the front-side negative mixture layer 121 and the negative current collecting member 128 and also the light quantity (energy quantity) of the laser beam LB allowed to pass through the back-side separator layer 154 and then reach the back-side negative mixture layer 122 and the negative current collecting member 128. Consequently, the manufacturing method in Example 3 enables quicker cutting of the strip-shaped separator layer-coated negative electrode 240A than the manufacturing method in Example 1.

The present disclosure is described in the embodiment (Examples 1 to 3) as above, but is not limited thereto. The present disclosure may be embodied in other specific forms without departing from the essential characteristics thereof.

For instance, Examples 1 to 3 show the separator layer-coated negative electrodes 140 and 240 as the separator layer-coated electrode. However, the present disclosure may also be applied to a separator layer-coated positive electrode. Specifically, the present disclosure may be applied to a method for manufacturing a separator layer-coated positive electrode including the positive current collecting member 138, the front-side positive mixture layer 131 laminated on the front surface 138b of the positive current collecting member 138, and a front-side separator layer laminated on the front-side positive mixture layer 131.

In Examples 1 to 3, furthermore, the thermoplastic resin particles 151 constituting the front-side separator layer 152 (the back-side separator layer 154) are polyethylene particles. As an alternative, other type of thermoplastic polyolefin particles different from polyethylene, for example, polypropylene particles, may be used as the thermoplastic resin particles.

In Example 2, the electrode body is produced as a laminated electrode body in which the double-sided laminated positive electrode 230 and the double-sided laminated separator layer-coated negative electrode 240 are laminated in their thickness direction. As an alternative, a wound electrode body may be produced in such a manner that a double-sided laminated positive electrode on a double-sided laminated separator layer-coated negative electrode manufactured by the manufacturing method of the present disclosure are overlapped and wound.

REFERENCE SINGS LIST 10, 20 Manufacturing apparatus (Manufacturing apparatus for separator layer-coated electrode)
11 Conveying device
11b, 11c, 11d Feed roller 12 Preheating device
13 Laser oscillator
14 Mirror
15 Laser irradiating device
100, 200 Lithium ion secondary battery
110, 210 Electrode body
120, 220 Negative electrode
121 Front-side negative mixture layer (Front-side electrode mixture layer)
122 Back-side negative mixture layer (Back-side electrode mixture layer)
128 Negative current collecting member (Current collecting member)
130, 230 Positive electrode
131 Front-side positive mixture layer
133 Back-side positive mixture layer
138 Positive current collecting member
140, 240 Separator layer-coated negative electrode (Separator layer-coated electrode)
140A, 240A Strip-shaped separator layer-coated negative electrode (Strip-shaped separator layer-coated electrode)
140b, 240b Laser irradiation target portion
151 Thermoplastic resin particles
152 Front-side separator layer
154 Back-side separator layer
DA Longitudinal direction of strip-shaped separator layer-coated electrode
DB Width direction of strip-shaped separator layer-coated electrode
DC Conveying direction of strip-shaped separator layer-coated electrode
LB Laser beam
S1, T1, U1 Preheating process
S2, T2, U2 Cutting process
W Melt width

What is claimed is:

1. A manufacturing apparatus for an electrode with a separator layer, the apparatus being configured to cut a strip-shaped separator layer-coated electrode by irradiation of a front laser beam and a rear laser beam to a laser irradiation target portion extending over a whole width of the strip-shaped separator layer-coated electrode to produce an electrode with a separator layer having a predetermined length, the strip-shaped separator layer-coated electrode including: a strip-shaped current collecting member having a front surface and a back surface; a front-side electrode mixture layer laminated on the front surface of the current collecting member; a front-side separator layer laminated on the front-side electrode mixture layer; a rear-side electrode mixture layer laminated on the back surface of the current collecting member; and a rear-side separator layer laminated on the rear-side electrode mixture layer, the front-side separator layer and the rear-side separator layer containing thermoplastic resin particles, wherein the manufacturing apparatus comprises:
conveying rollers configured to convey the strip-shaped separator layer-coated electrode in a conveying direction from one side to other side in a longitudinal direction of the strip-shaped separator layer-coated electrode;
a front heater and a rear heater configured to preheat the front-side separator layer and the rear-side separator layer respectively in the laser irradiation target portion of the strip-shaped separator layer-coated electrode that is being conveyed by the rollers; and
a front oscillator and a rear oscillator placed on a more downstream side than the front and rear heaters in the conveying direction, and
wherein the front and rear oscillators are configured to irradiate the front laser beam from a front-side separator layer side to the laser irradiation target portion of the strip-shaped separator layer-coated electrode that is being conveyed by the conveying rollers and the rear laser beam from a rear-side separator layer side to the laser irradiation target portion of the strip-shaped separator layer-coated electrode that is being conveyed by the conveying rollers respectively, the laser irradiation target portion including the front-side separator layer and the rear-side separator layer preheated by the front and rear heaters, to cut the strip-shaped separator layer-coated electrode.

* * * * *